US009661601B2

(12) United States Patent
Fischer et al.

(10) Patent No.: US 9,661,601 B2
(45) Date of Patent: May 23, 2017

(54) CROWDSOURCING INFORMATION IN A COMMUNICATION NETWORK USING SMALL CELLS

(71) Applicant: QUALCOMM Incorporated, San Diego, CA (US)

(72) Inventors: Sven Fischer, Nuremberg (DE); Dominic Farmer, Los Gatos, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 13/714,333

(22) Filed: Dec. 13, 2012

(65) Prior Publication Data

US 2014/0171097 A1 Jun. 19, 2014

(51) Int. Cl.
| | | |
|---|---|---|
| *H04W 24/00* | (2009.01) | |
| *H04W 64/00* | (2009.01) | |
| *H04W 4/02* | (2009.01) | |
| *G01S 5/02* | (2010.01) | |
| *H04W 84/04* | (2009.01) | |

(52) U.S. Cl.
CPC ........... *H04W 64/00* (2013.01); *G01S 5/0242* (2013.01); *H04W 4/02* (2013.01); *H04W 84/045* (2013.01)

(58) Field of Classification Search
CPC ................................. H04W 64/00; H04W 4/02
USPC ............... 455/456.1, 443, 444, 448
See application file for complete search history.

(56) References Cited

U.S. PATENT DOCUMENTS

| | | | | |
|---|---|---|---|---|
| 5,960,341 | A * | 9/1999 | LeBlanc et al. ........... | 455/426.1 |
| 2011/0117932 | A1 | 5/2011 | Breitbach et al. | |
| 2011/0246148 | A1 | 10/2011 | Gupta et al. | |
| 2012/0030734 | A1 | 2/2012 | Wohlert | |

(Continued)

FOREIGN PATENT DOCUMENTS

| | | |
|---|---|---|
| WO | 2012075397 A1 | 6/2012 |
| WO | WO-2012075050 A1 | 6/2012 |
| WO | WO-2012152988 A1 | 11/2012 |

OTHER PUBLICATIONS

International Search Report and Written Opinion—PCT/US2013/070867—ISA/EPO—Apr. 2, 2014.

*Primary Examiner* — Chuck Huynh
(74) *Attorney, Agent, or Firm* — Kilpatrick Townsend & Stockton LLP

(57) ABSTRACT

Methods, systems, computer-readable media, and apparatuses for using a small cell as a reliable crowd-sourcing agent are presented. In some embodiments, a small cell installed at a known location may observe one or more wireless signals at the known location, wherein the small cell comprises a built-in network listen receiver for observing cellular downlink signals. Subsequently, the small cell may provide, to at least one crowdsourcing server, information that identifies the location and describes one or more detected properties of the one or more observed wireless signals. In at least one arrangement, the information provided to at least one crowdsourcing server is a Positioning Reference Signal (PRS) configuration based on an observed LTE downlink signals. In at least one arrangement, the information provided to at least one crowdsourcing server is configured to be used by the at least one crowdsourcing server in providing position assistance information.

51 Claims, 20 Drawing Sheets

(56) References Cited

U.S. PATENT DOCUMENTS

| | | | |
|---|---|---|---|
| 2012/0252463 A1 | 10/2012 | Zou et al. | |
| 2013/0110454 A1* | 5/2013 | Sidhu | G01C 21/16 702/150 |
| 2014/0081572 A1* | 3/2014 | Poornachandran | H04W 4/02 701/537 |
| 2015/0050947 A1* | 2/2015 | Wirola et al. | 455/456.1 |

* cited by examiner

Small Cell

Crowdsourcing Architecture

Mapping of positioning reference signals (normal cyclic prefix)

PRS Transmission Schedule

PRS subframe configuration

Determination of PRS Schedule

Example of subframe PRS correlation results with different replica signals bandwidth Example of subframe PRS correlation results with different replica signals bandwidth Correlation Result with 6 resource blocks    Correlation Result with 15resource blocks    Correlation Result with 25resource blocks    Correlation Result with 50 resource blocks Example of subframe PRS correlation results with different replica signals bandwidth Example of PRS Muting pattern PRS configuration example with several cells and alternating muting pattern

CROWDSOURCING INFORMATION IN A COMMUNICATION NETWORK USING SMALL CELLS

BACKGROUND

Aspects of the disclosure relate to computing technologies, including computer software and computer hardware. In particular, various aspects of the disclosure relate to using small cells (e.g., micro, pico or femto cells) as reliable crowdsourcing agents.

A number of software applications, websites, and other functionalities that can be provided on a mobile device are beginning to use position information to further enhance a user's experience when using such a device. For example, a device may access a particular website, such as a restaurant review website, and the website may use information about the device's current location in order to provide location-specific content, such as reviews of nearby restaurants, to the device. Other applications and websites may, for instance, use information about a device's current location to display relevant maps to a user, provide the user with information about local businesses, or inform the user of a local weather forecast.

An ability to estimate a mobile device's location may be made possible by any one of several signals-based position estimation technologies such as, for example, satellite positioning systems (e.g., the Global Positioning System (GPS) and the like), advanced forward-link trilateration (AFLT), observed time difference of arrival (OTDOA), enhanced cellular identification (ECID), just to name a few examples.

In many instances, a mobile device that estimates a position as a result of receiving signals from base stations of a cellular network or from space vehicles of a satellite positioning system (SPS), for example, may be assisted by signals from a terrestrial cellular voice or data communications system. Such assistance may reduce a time required by the mobile device to acquire positioning signals, and may include information to allow position calculation, such as location of base stations or access points, timing of or between base stations, positioning reference signal (PRS) structure information, and the like.

One way for obtaining such assistance information (e.g., base station's location, timing between base stations, radio parameters) is via mobile device crowdsourcing.

In mobile device crowdsourcing, a multitude of mobile devices send observed data to a crowdsourcing server. Examples of observed data can include signal strength information, timing information of base stations or between base stations, round-trip-time (RTT) measurements, or the like. The observed data can further be associated with a particular source identifier (e.g., a cell-identifier (ID) of the base station, medium access control (MAC) address of the access point) and tagged with the mobile device's location, if available. A crowdsourcing server can estimate information based on the received observed data from multiple mobile devices. The estimated information (e.g., base station/access point locations, base station/access point coverage areas, base station/access point timing) can be stored in a database. The database may be used for assisted position calculation, or to provide assistance data to other mobile devices in the network. Additionally, even though an individual mobile device-observed data may be inaccurate, the consensus of the multitude of mobile devices can be more precise. Furthermore, mobile device crowdsourcing may obtain necessary information of the radio network (e.g., base station/access point locations, timing information) which would otherwise be difficult or impossible to obtain.

Crowdsourcing via mobile devices may encounter several disadvantages associated with using a mobile device as a crowdsourcing agent including limited battery life, position uncertainty, and comparative availability. The crowdsourcing activity in the mobile device may impact user experience (e.g., significantly draining the battery, make the mobile device less responsive to user interactions). Additionally, it can require bandwidth of the communications network for uploading the measurement data to the server over the air. In addition, the mobile device's location may be needed for the server to correctly estimate information based on the observed data. The mobile device's location may not be available or obtaining it may further drain the battery. The quality of the information maintained by the crowdsourcing servers can be inaccurate if the mobile device's location is inaccurate.

Furthermore, there may be privacy concerns with the mobile device crowdsourcing approach, since the mobile device is associated with a particular user/subscriber, and the observed data may reveal information about the user (e.g., his/her location). Therefore, the user of the mobile device can have the option to explicitly allow or deny the reporting of the observed data. If many users deny the data reporting, the quality of the information maintained by the crowdsourcing servers might be less than desired.

BRIEF SUMMARY

Certain embodiments are described that relate to using small cells as reliable crowd-sourcing agents. In contrast to mobile devices, small cells (e.g., microcells, picocells, femtocells) may have a known location, may have a wired broadband connection to the Internet and may not be powered by a battery. Additionally, the location of small cells may change very rarely, or not at all. This makes small cells suited for crowdsourcing information, since it avoids the disadvantages of the mobile device crowdsourcing approach.

In some embodiments, a small cell installed at a known location may observe one or more wireless signals at the known location, wherein the small cell comprises a built-in network listen receiver for observing cellular downlink signals. Subsequently, the small cell may provide, to at least one crowdsourcing server, information that identifies the location and describe one or more detected properties of the one or more observed wireless signals. In at least one arrangement, the information provided to at least one crowdsourcing server is a positioning reference signal (PRS) configuration based on observed long term evolution (LTE) downlink signals. In at least one arrangement, the information provided to at least one crowdsourcing server includes PRS bandwidth information, PRS configuration index information, number of PRS subframes, and/or PRS muting or idle patterns based on observed LTE downlink signals. In at least one arrangement, the information provided to at least one crowdsourcing server is configured to be used by the at least one crowdsourcing server in providing position assistance information to one or more mobile devices located in a vicinity of the location.

According to another embodiment, a small cell for crowdsourcing wireless signals may comprise: one or more small cell baseband processors; and memory storing computer-readable instructions that, when executed by the one more small cell baseband processors, cause the small cell to: observe one or more wireless signals at a known location at which the small cell is installed, wherein the small cell comprises a built-in network listen receiver for observing cellular downlink signals; and provide, to at least one crowdsourcing server, information that identifies the known location and describes one or more detected properties of the one or more observed wireless signals, wherein the information is used by the at least one crowdsourcing server in providing position assistance information to one or more mobile devices located in a vicinity of the known location.

According to another embodiment, the small cell-based method for crowdsourcing wireless signals may comprise: a means for observing, by a small cell installed at a known location, one or more wireless signals at the known location, wherein the small cell comprises a built-in network listen receiver for observing cellular downlink signals; and a means for providing, by the small cell, to at least one crowdsourcing server, information that identifies the known location and describes one or more detected properties of the one or more observed wireless signals, wherein the information is used by the at least one crowdsourcing server in providing position assistance information to one or more mobile devices located in a vicinity of the known location.

According to another embodiment, one or more computer-readable media storing computer-executable instructions for crowdsourcing wireless signals that, when executed, may cause one or more computing devices included in a small cell to: observe one or more wireless signals at a known location at which the small cell is installed, wherein the small cell comprises a built-in network listen receiver for observing cellular downlink signals; and provide, to at least one crowdsourcing server, information that identifies the known location and describes one or more detected properties of the one or more observed wireless signals, wherein the information is used by the at least one crowdsourcing server in providing position assistance information to one or more mobile devices located in a vicinity of the known location.

In some embodiments, a multitude of small cells with a crowdsourcing client can monitor the radio environment (e.g., a global system for mobile communications (GSM) network, a universal mobile telecommunications system (UMTS), wireless local area network (WLAN)) and can report the measurement data to a crowdsourcing server. In one or more arrangements, the monitored network does not need to use the same technology as the small cell. For example, a GSM or WLAN network may be monitored by an LTE small cell.

For example, the crowdsourcing client, in the small cell, may perform the access network observations using a network listen receiver. The crowdsourcing client may, optionally, also receive or derive global navigation satellite system (GNSS) readings. The network listen receiver may listen to downlink transmissions (e.g., broadcast signals) at licensed frequencies (e.g., GSM, UMTS, LTE, code division multiple access (CDMA)), and also at unlicensed frequencies (e.g., WLAN). The GNSS function in the network listen receiver may time stamp radio frames with GNSS system time and deliver these cellular-GNSS time associations to the crowdsourcing client. Alternatively, the crowdsourcing client itself may derive the cellular-GNSS time association.

According to some embodiments, the crowdsourcing client may process the data according to certain requirements to determine the measurement data. For example, it may determine received signal strength indications, RTT measurements for the received base stations and/or access points. The measurement data processing may, optionally, make use of a local database (e.g., base station coordinates, access point coordinates). The local database may be generated by the crowdsourcing client or may be received from a crowdsourcing server. The measurement data can then be encapsulated in a particular crowdsourcing protocol, and an upload manager can transmit the measurement data via the network to a crowdsourcing server.

In some embodiments, a crowdsourcing server may comprise at least one processor; and memory storing computer-readable instructions that, when executed, cause the server to receive, from a small cell installed at a known location, information describing one or more wireless signals observed by the small cell at the known location, wherein the small cell comprises a built-in network listen receiver for observing cellular downlink signals; update a database based on the received information; and provide location assistance information to one or more mobile devices using information included in the database.

In another embodiment, a method for crowdsourcing wireless signals using a crowdsourcing server may comprise: receiving, from a small cell installed at a known location, information describing one or more wireless signals observed by the small cell at the known location, wherein the small cell comprises a built-in network listen receiver for observing cellular downlink signals; updating a database based on the received information; and providing location assistance information to one or more mobile devices using information included in the database.

In another embodiment, one or more computer-readable media storing computer-executable instructions for crowdsourcing wireless signals that, when executed, may cause one or more computing devices included in a crowdsourcing server to: receive, from a small cell installed at a known location, information describing one or more wireless signals observed by the small cell at the known location, wherein the small cell comprises a built-in network listen receiver for observing cellular downlink signals; update a database based on the received information; and provide location assistance information to one or more mobile devices using information included in the database.

In another embodiment, a method for crowdsourcing wireless signals using a crowdsourcing server may comprise: a means for receiving, from a small cell installed at a known location, information describing one or more wireless signals observed by the small cell at the known location, wherein the small cell comprises a built-in network listen receiver for observing cellular downlink signals; a means for updating a database based on the received information; and a means for providing location assistance information to one or more mobile devices using information included in the database.

In one or more arrangements, the information provided to the crowdsourcing server may be configured to be position location data. For example, the crowdsourcing server may be configured to receive observed signal information from a mobile device, analyze this information by comparing the signals observed by the mobile device with stored information originally received from one or more small cells (and possibly other sources) about observable signals in various locations, and determine an estimated position of the mobile device based on the analysis of the signals observed by the mobile device. In other examples, the crowdsourcing server may be configured to provide the stored information to a mobile device so as to allow the mobile device to analyze the observed signal information and determine an estimated position for itself.

In one or more arrangements, the information that characterizes the fixed location and describes the one or more detected properties of the one or more observed wireless signals may include one or more received signal strength indication (RSSI) measurements corresponding to the one or more observed wireless signals, one or more time of arrival (TOA) measurements corresponding to the one or more observed wireless signals, one or more time difference of arrival (TDOA) measurements corresponding to two or more observed wireless signals, one or more angle of arrival (AOA) measurements corresponding to the one or more observed wireless signals, and/or one or more round trip time (RTT) measurements corresponding to the one or more observed wireless signals. These various properties may, for instance, provide the criteria for comparing observed wireless signals with stored information about observable signals, and thereby may facilitate determining an estimated position based on information about signals observed by a particular device.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
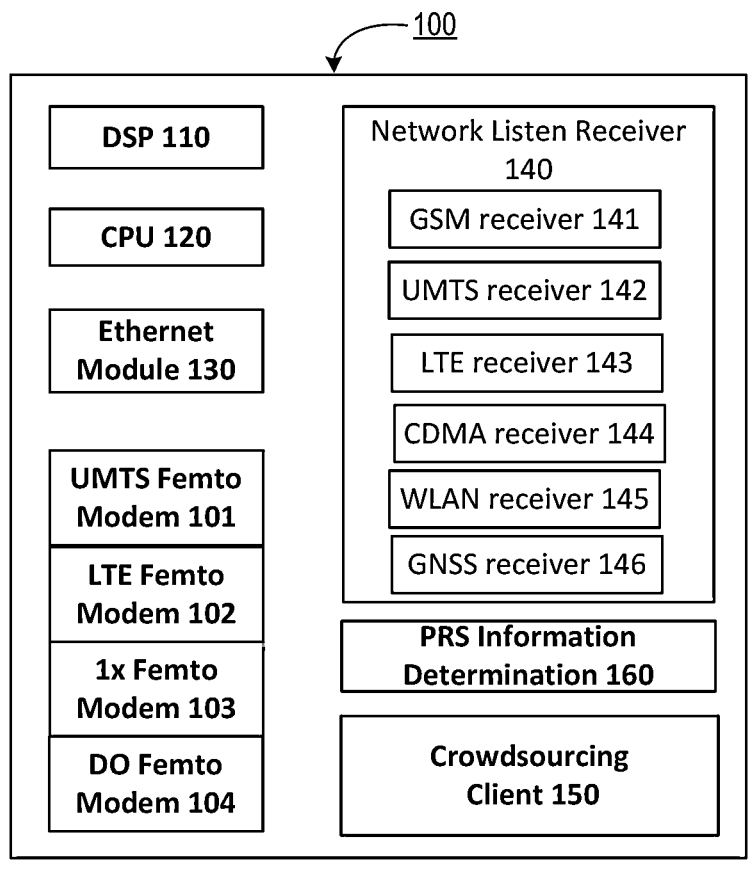
FIG. 1 illustrates a simplified diagram of a small cell and its associated modules.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Certain embodiments are described that relate to using small cells for observing wireless signals and reporting measurement data about observed signals to a crowdsourcing server. Small cells can include low-powered radio access nodes, such as a femtocell, picocell, and microcell. This may enable other devices, such as mobile wireless devices, to determine their position based on the signals that they can observe and the information received from the crowdsourcing server. Such assistance information received from a crowdsourcing server may also reduce a time required by the mobile device to acquire positioning signals, and may include information to allow position calculation, such as location of base stations or access points, timing of or between base stations, positioning reference signal (PRS) structure information, and the like While some conventional systems may provide other types of signal-observation-based position determination and assistance data information, these systems often rely on expensive, inaccurate, and inconvenient techniques for gathering information about the wireless signals that are observable in particular locations, such as war driving or mobile-device-based crowd-sourcing. By using small cells as reliable crowd-sourcing agents, however, in accordance with various aspects of the disclosure, information about observable wireless signals at various locations can be gathered and compiled more easily, accurately, and conveniently.

Advantages of Small Cells as a Crowdsourcing Agent

Small cells can be ideal for crowdsourcing because small cells may be located at a fixed or known location. Additionally, small cells can communicate over a wired network, which does not create more air traffic for measurement reporting. Furthermore, small cells do not have to be powered by battery; so they are not power-constrained and can constantly monitor signals. Small cells can also have more processing power than mobile devices (e.g., processing complex LTE correlation data).

In various embodiments small cells (e.g., micro, pico or femto cells) are used as reliable crowdsourcing agents. Certain aspects relate to techniques that utilize the capabilities of small cells to collect information about observed wireless signals that can be used by mobile devices as crowd-sourced location assistance information. For example, position location methods (e.g., observed time difference of arrival (OTDOA), advanced forward link trilateration (AFLT), WLAN positioning, assisted-GNSS (A-GNSS)) requires the geographical location of base stations or access points, and timing between base stations and radio parameters (e.g., idle/muting periods, reference signal/pilot configurations). One way for obtaining such information is via small cells crowdsourcing. Small cells are particularly suited for crowdsourcing information, because they avoid disadvantages of the mobile device crowdsourcing approach, as discussed in the background section.

Furthermore, heterogeneous networks, or HetNet, have emerged to increase mobile data traffic capacity in communication networks. HetNet can use multiple types of access nodes in a wireless network. For example, a HetNet can use macrocells and small cells (e.g., microcells, picocells, femtocells) for wireless coverage in an environment with a wide variety of wireless coverage zones. The idea is to have a macrocells (e.g., high power base station) cooperating with small cells (e.g., microcells, picocells, femtocells) to work together within the macro network. As demand for more mobile data traffic increases, HetNets can become more prominent, and the number of small cells can increase. Therefore, having a large quantity of small cells can make the crowdsourcing more accurate.

Small cells can be leveraged to improve coverage and deliver capacity inside buildings. An example of a femtocell can be a home base station where a user plugs it into a home or office broadband connection to boost network signals inside buildings. For example, a picocell can be used to extend outdoor signal coverage to an indoor area such as metro station or to add network capacity in an area with dense phone usage. An example of a microcell can be a low power cell in a cellular network served by a base station, covering a limited area such as a building. According to one embodiment, the range of a microcell can be two miles; a picocell can be 200 yards; and a femtocell can be 20 yards, whereas a standard base station can have a range of 22 miles.

Furthermore, the location of the small cells may be required in order to confirm that the small cell is being used within the operator's licensed region. It may also be used to ensure that commercial restrictions on the use of the small cell are complied with. Therefore, the location of the small cells may be known.

For example, there are several approaches for determining the small cell location. The most widely used approach is the use of an A-GNSS module inside the small cell. Additionally, the GNSS location assistance data may be obtained from a location server via the broadband connection of the small cell (e.g., digital subscriber line (DSL), power line communication).

Small cells can have a known location and may have wired broadband connection to the internet. The location of the small cell usually changes very rarely, or not at all. Additionally, small cells are not powered by a battery. Furthermore, the population of small cells is expected to be high in the future, as previously mentioned with the HetNet implementation. Therefore, it can be foreseeable that each building or room may be deployed with a small cell to fulfill the bandwidth demands of future mobile communications.

This makes small cells perfectly suited for crowdsourcing information of the e.g., macro network, since they avoid the disadvantages of the mobile device crowdsourcing approach described in the background section.

Network Monitoring Using Small Cells

A network listening module (NLM) (also referred to as network listen receiver 140) which may be already available in small cells (e.g., femtocells), can be modified to include an additional crowdsourcing module for additional measuring capabilities. The NLM may receive continuously and operates alongside the small cell radio. This allows long observation or listen times, which for example, may be desirable for determining PRS configuration parameters for LTE signals.

As previously mentioned, the monitored network does not need to use the same technology as the small cell. For example, a GSM or WLAN network may be monitored by a LTE small cell.

A small cell may monitor a radio network continuously, since the small cell is usually not powered by a battery. The small cell may obtain measurements needed to derive the necessary information, such as base station locations of the e.g., macro network, timing information (e.g., base station timing relative to GNSS time), or pilot signal configuration (e.g., LTE positioning reference signal (PRS) structure, muting or idle patterns).

Various embodiments will now be discussed in greater detail with reference to the accompanying figures, beginning with FIG. 1.

FIG. 1 illustrates a simplified diagram of a small cell 100 and its associated modules. For example, a small cell (e.g., femtocell) may include modems (e.g., UMTS femto modem 101, LTE femto modem 102, cdma2000 1× femto modem 103, data only (DO) or high rate packet data (HRPD) femto modem 104), a digital signal processor (DSP) 110, a central processing unit (CPU) 120, and an ethernet module 130. The small cell 100 may also include a network listen receiver 140, which may be able to receive signals from various access networks using various network receivers (e.g., GSM receiver 141, UMTS receiver 142, LTE receiver 143, CDMA receiver 144, WLAN receiver 145). According to some embodiments, the network receivers can be incorporated in one physical receiver module or in multiple receiver modules. The network listen receiver 140 can also include a GNSS receiver 146 for position location and timing determination. The GNSS receiver 146 may also have the capability for time stamping the various access network signals with a GNSS time (e.g., for providing fine time assistance measurements).

GSM, UMTS and LTE are described in documents from a consortium named "3rd Generation Partnership Project" (3GPP). cdma2000 1×, DO, and HRPD are described in documents from a consortium named "3rd Generation Partnership Project 2" (3GPP2). 3GPP and 3GPP2 documents are publicly available. A WLAN may include an IEEE 802.11 network.

The GNSS receiver may comprise a global positioning system (GPS) receiver, a Galileo receiver, a Glonass receiver, a Quasi-Zenith Satellite System (QZSS) receiver, an Indian Regional Navigational Satellite System (IRNSS)

receiver, a Beidou/Compass receiver, a Satellite Based Augmentation System (SBAS)) receiver, and/or the like.

In some embodiments, the network listen receiver 140 may observe wireless signals at the location at which the small cell is installed. For example, the network listen receiver 140 may observe wireless signals transmitted by a macro BS 310 by detecting the presence of these signals and measuring various properties of these signals, which may include taking one or more received signal strength indication (RSSI) measurements, one or more time of arrival (TOA) measurements, one or more time difference of arrival (TDOA) measurements, one or more angle of arrival (AOA) measurements, and/or one or more round trip time (RTT) measurements. While these measurements are listed here as examples, other measurements may similarly be taken by the network listen receiver 140 in addition to and/or instead of one or more of these measurements.

As another example, the network listen receiver 140 may observe wireless signals transmitted by an access point 320 by similarly detecting the presence of these signals and measuring various properties of the signals. For instance, access point 320 may be configured to provide a local wireless network, and the network listen receiver 140 may detect and observe signals transmitted by access point 320 in providing the local network.

In some embodiments, one or more receivers in the network listen receiver 140 may both actively observe wireless signals and passively observe wireless signals. In a passive mode, one or more receivers in the network listen receiver 140 may receive signals and measure wireless signals. On the other hand, in an active mode, one or more receivers in the network listen receiver 140 may send a probe message and wait for a response. This may, for instance, be used in observing WLAN signals using WLAN receiver 145 which has additional transmit capability in such an embodiment, in which the WLAN receiver 145 may periodically send a probe request that causes all wireless access points detecting the probe request to respond. If RTT information is being gathered by the WLAN receiver 145 for example, the WLAN receiver 145 may send an active probe, wait for a response, and then measure the round trip time between sending the probe and receiving the response(s).

In some embodiments, in addition to being configured to observe wireless signals described above (e.g., GSM signals, UMTS signals, LTE signals, CDMA signals, WLAN signals, and/or GNSS signals) transmitted by access points and/or base stations and/or space vehicles, the small cell also may be configured to observe wireless signals transmitted by one or more other devices instead of and/or in addition to the access points, base stations, and space vehicles discussed above. For example, the small cell additionally or alternatively may be configured to observe broadcast and/or wireless broadband signals (e.g., DTV signals, MediaFLO signals, ISDB-T signals, DVB-H signals, etc.), WLAN signals (e.g., Zigbee signals, BT signals, UWB signals, NFC signals, RFID signals, etc.), and/or any other type(s) of signals. As discussed in greater detail below, in addition to observing various signals, the small cell 100 may gather and report information about any and/or all of the signals that are observed to a crowdsourcing server 330.

One or more communication paths may be provided that enables the one or more modules described in FIG. 1 to communicate with and exchange data with each other. In addition, the various modules illustrated in FIG. 1 may be implemented in software, hardware, or combinations thereof.

In various embodiments, small cell 100 may include other modules than those shown in FIG. 1. Additionally, the embodiment shown in FIG. 1 is only one example of a system that may incorporate some embodiments, and in other embodiments, small cell 100 may have more or fewer modules than those illustrated in FIG. 1, may combine two or more modules, or may have a different configuration or arrangement of modules.

In some embodiments, the network listen receiver 140 can observe one or more wireless signals at the location at which the small cell is deployed. In observing wireless signals, the small cell may, for instance, enable one or more wireless interfaces, provided by the small cell 100, to scan for and receive one or more wireless signals that are capable of being received at the location, and record and store information describing various properties of the received wireless signals, as well as any other information that may be desirable, such as the time and/or date at which the signals were received. Any and/or all of this information may subsequently be reported to a crowdsourcing server 330, for instance, by the Ethernet module 130.

Additionally, the network listen receiver 140 can unique to a small cell. For example, a small cell can use an network listen receiver 140 to determine the level of interference at the location where the small cell is deployed, which is needed for various self-configuration purposes.

According to some embodiments, the small cell 100 can include a crowdsourcing client 150. The crowdsourcing client 150 can collect data from the network listen receiver 140, and determines desired data for uploading to a crowdsourcing server 330.

It should be noted that a Wi-Fi access point (AP) cannot be used for the crowdsourcing purposes as described in this disclosure. Unlike a small cell, the Wi-Fi AP does have a network listen receiver which operates alongside the Wi-Fi AP. For example, a Wi-Fi AP cannot listen to cellular signals (e.g., LTE signals). Additionally, a Wi-Fi AP is not required to have a known location. A Wi-Fi AP requires at least a network listen receiver 140, which is not built-in in a conventional Wi-Fi AP. In contrast, a small cell 100 has the required hardware (e.g., network listen receiver 140) for crowdsourcing purposes already built-in.

Similarly, a plurality of macrocells cannot be used for the crowdsourcing purposes as described in this disclosure. Unlike small cells, macrocells cannot listen to downlink signals. Rather, macrocells can only transmit downlink signals.

According to some embodiments, a small cell may comprise of a base station with all the common base station functionality and a network listen receiver. For example, the network listen receiver can be similar to user equipment (UE) device that is only receiving. Both elements work alongside and independent of each other. The base station part can be the communication part. The network listen receiver can be the monitoring device to assist the self-configuration process (e.g., set transmit power, determine neighbor lists for UE handover) of the base station. For example, the self-configuration process can include items which a macro cell deployment would do as part of the cell deployment/planning process. Additionally, a small cell may be deployed by the user, therefore requiring the small cell to self-configure using the network listen receiver for assistance to help provide the necessary measurements.

Furthermore, the network listen receiver 140 is unique to a small cell. For example, the network listen receiver 140 can be used to determine the level of interference at the location where the small cell is deployed, which may be needed for various self-configuration purposes. A conventional small cell includes a built-in network listen receiver. As a result, the built-in network listen receiver makes the small cell suited for crowdsourcing, because the required hardware is already built-in and needed for self-configuration purposes. Crowdsourcing using small cells takes advantage of the availability of the network listen receiver being already built-in the small cell.

According to some embodiments, the PRS information determination module 160 and crowdsourcing client 150 can be implemented by software and be specifically designed for crowdsourcing purposes.

Reporting Measurement Data to a Crowdsourcing Server

The small cells may report the measurement data, for example, when requested by a crowdsourcing server, or may report the measurements periodically, or may report the measurements when there is a change in the reporting quantity.

In particular, in some embodiments, the crowdsourcing client 150 may cause the small cell to report measurement data about the observed signals to the crowdsourcing server 330, which may access, store, and/or maintain a location assistance server 360 in which information about the wireless signals that are observable at various locations may be stored. In reporting the measurement data about the observed signals to the crowdsourcing server 330, the crowdsourcing client 150 may, for instance, establish a data connection with the crowdsourcing server 330 via the Ethernet module 130 and subsequently send one or more data messages to the crowdsourcing server 330. In some embodiments, one or more of these messages sent by the crowdsourcing client 150 may be a signal observations message, as discussed in greater detail below.

Figure 2:
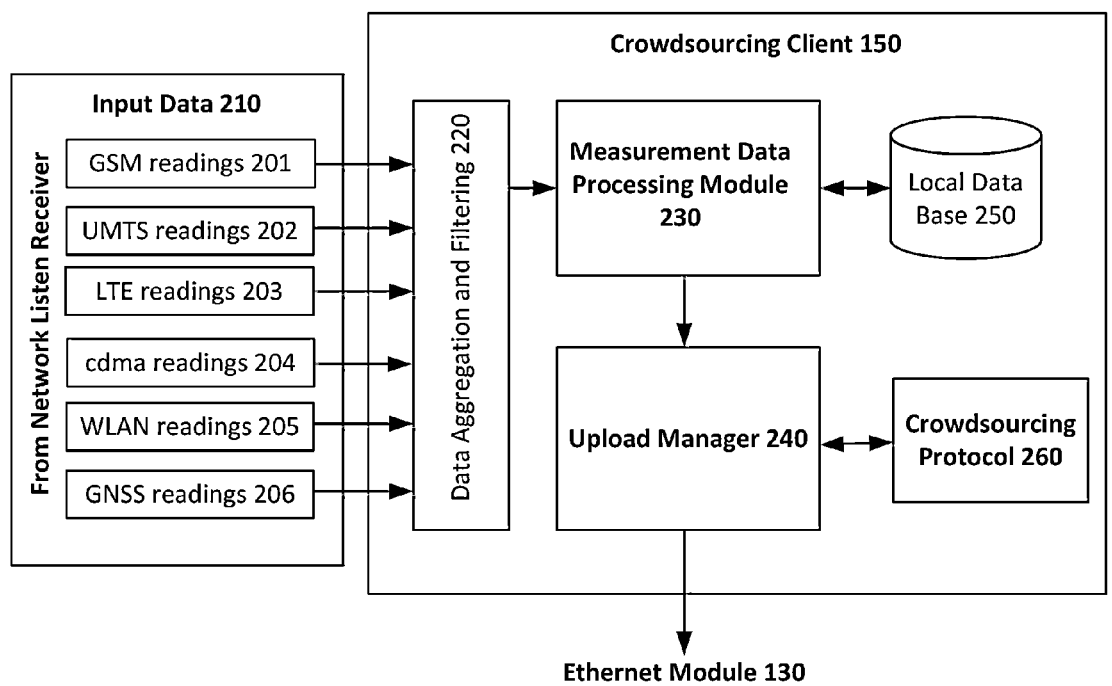
FIG. 2 illustrates a simplified diagram of a crowdsourcing client according to some embodiments.

FIG. 2 illustrates a simplified diagram of the crowdsourcing client 150. The crowdsourcing client 150 can receive input data 210 from the network listen receiver 140. Examples of input data 210 can include access network observations from the network listen receiver 140, together with GNSS readings 206. The network listen receiver 140 may listen to downlink transmissions (e.g., broadcast signals) at frequencies of the macro network (e.g., GSM readings 201, UMTS readings 202, LTE readings 203, CDMA readings 204), but also at unlicensed frequencies (e.g., WLAN readings 205). As previously mentioned, the GNSS receiver 146 in the network listen receiver 140 may also time stamp radio frames with the GNSS system time, and deliver these cellular-GNSS time associations to the crowdsourcing client 150, or the crowdsourcing client 150 itself may derive the cellular-GNSS time association.

According to some embodiments, the crowdsourcing client 150 can aggregate and filter the input data 210 using the data aggregation and filtering module 220. The measurement data processing module 230 can take the outputted data from the data aggregation and filtering module 220 to process and obtain measurement data. For example, measurement data can include received signal strength indications, RTT measurements for a macro base station (BS) 310 or an access point 320. According to some embodiments, the measurement data processing module 230 can use location information (e.g., base station or access point coordinates) stored in a local database 250. For example, the location information in the local database 250 may be generated by the crowdsourcing client 150, or the location information may have been received from the crowdsourcing server or from a location server. For example, location information (e.g., base station coordinates) can be used to improve the fine time assistance measurements (cellular-GNSS time associations), because the propagation delay between the small cell 100 and the macro BS 310 can then be compensated.

The crowdsourcing client 150 can encapsulate the measurement data using a crowdsourcing protocol 260 and use an upload manager 240 to transmit the measurement data to the Ethernet module 130 in the small cell 100 for uploading to a crowdsourcing server 330.

In some embodiments, the Ethernet module 130 may enable the crowdsourcing client 150 to communicate electronically with one or more other devices. The Ethernet module 130 may include one or more wired and/or wireless interfaces via which the crowdsourcing client 150 may send and/or receive information. Examples of wired interfaces that may be included in the Ethernet module 130 include one or more Ethernet interfaces, one or more serial port interfaces, and/or other wired communications interfaces. Examples of wireless interfaces that may be included in the Ethernet module 130 (e.g., using a wireless adapter) include one or more cellular communications interfaces (e.g., one or more CDMA interfaces, WCDMA interfaces, GSM interfaces, etc.), one or more WLAN interfaces (e.g., one or more IEEE 802.11 interfaces), and/or other wireless communications interfaces (e.g., Bluetooth).

Figure 3A:
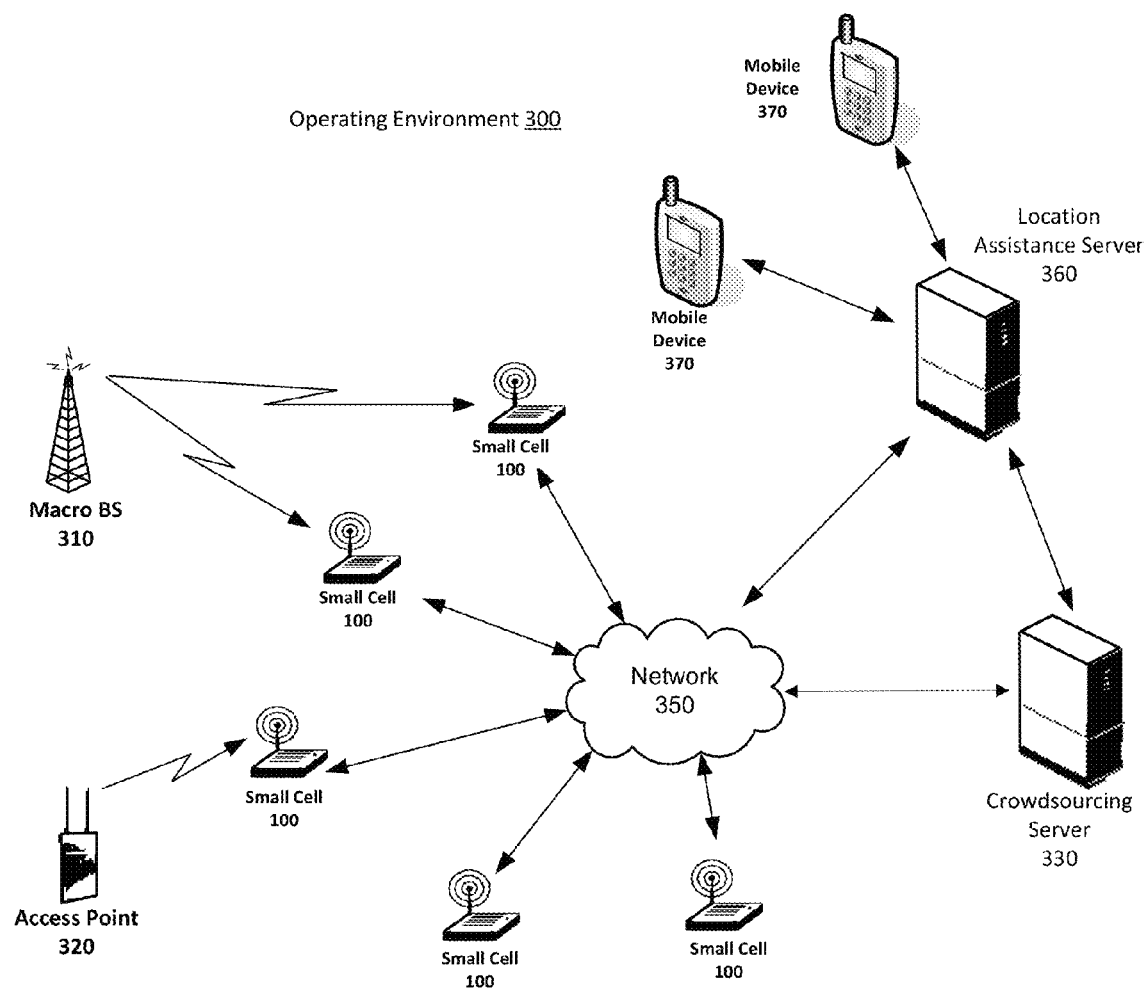
FIG. 3A illustrates a simplified diagram of a crowdsourcing architecture according to some embodiments.

FIG. 3A illustrates a simplified architecture of crowdsourcing using small cells. A multitude of small cells using a crowdsourcing client 150 can monitor the radio environment (e.g., GSM, UMTS, WLAN) of macro BS 310 and access point 320 and report the measurement data to a crowdsourcing server 330. Although, FIG. 3A shows only one macro BS 310 and one access point 320, it should be understood that multiple macro base stations and/or access points may be available in a network. According to some embodiments, the small cell 100 can transmit the measurement data to the crowdsourcing server 330 via a network 350. In one or more arrangements, the crowdsourcing server 330 may be configured to access, store, and/or maintain a signal database in which information about the wireless signals that are observable at various locations may be stored. For example, via the network 350, the crowdsourcing server 330 may receive information about wireless signals observed at particular locations from small cells. Subsequently, the crowdsourcing server 330 may aggregate, refine, and/or filter such information, and perform other functions associated with maintaining the server, such as updating uncertainty values and/or reliability factors corresponding to various measurements, or calculating base station/access point coordinates.

Figure 3B:
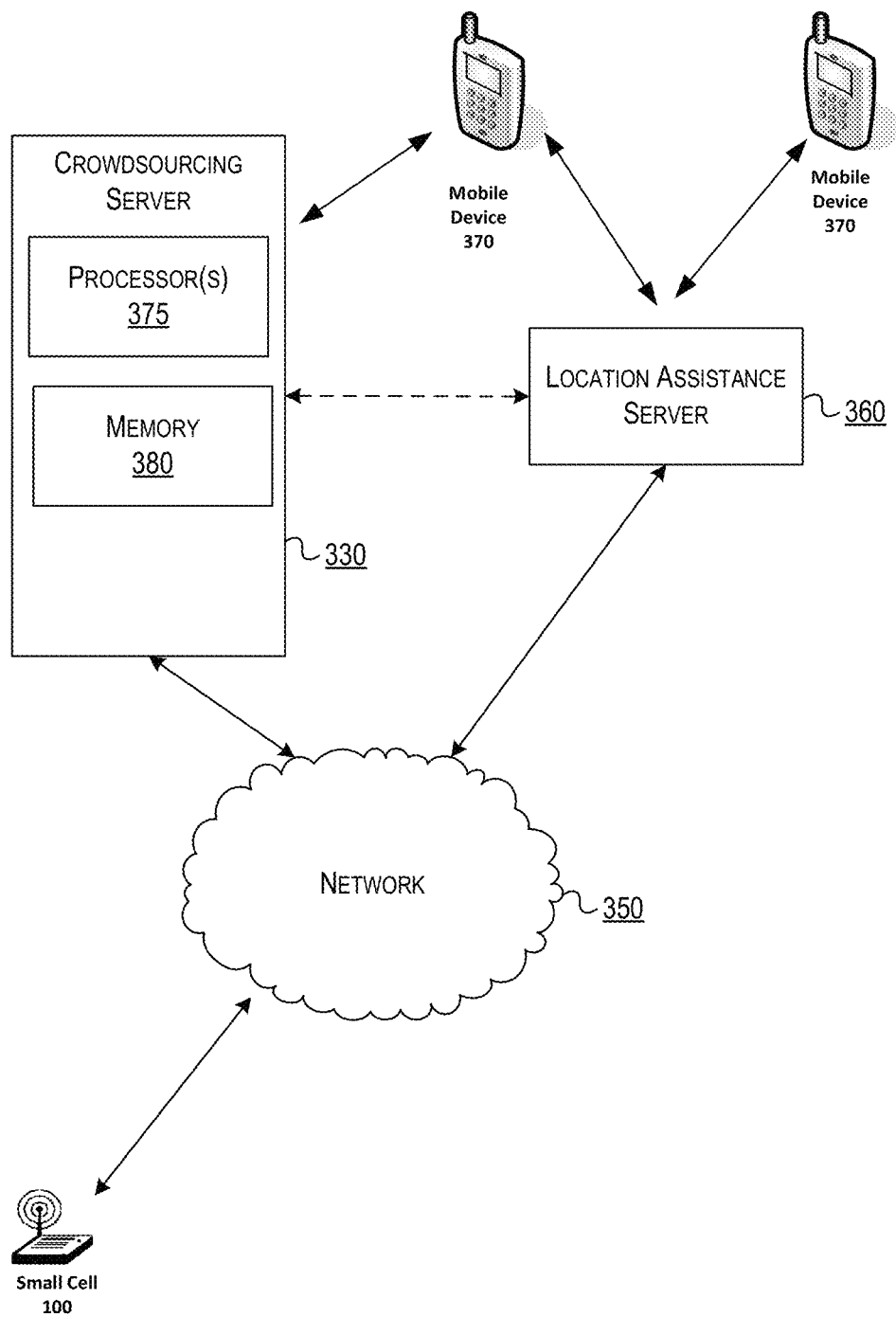
FIG. 3B illustrates a simplified diagram of a crowdsourcing server and its associated modules.

FIG. 3B illustrates a simplified diagram of a crowdsourcing server 330 and its associated modules. The method of using a crowdsourcing server to provide location assistance data to mobile devices is further explained in FIG. 4E. For example, a crowdsourcing server 330 may include one or more processor(s) 375 and memory 380 storing instructions that cause the crowdsourcing server 330 to receive via a network 350 information describing wireless signals from a small cell 100. The crowdsourcing server 330 can update the location assistance server 360 based on the received information. Additionally, the crowdsourcing server 330 and/or location assistance server 360 can provide assistance information to one or more mobile device 370.

In some embodiments, crowdsourcing server 330 may further use the measurements provided by crowdsourcing client 150 to determine the locations of macro base stations 310 or access points 320 using a reverse positioning mechanism for example. Traditionally, devices at unknown location establish their position by measuring the propagation delay or delay differences to multiple base stations with known position and applying multilateration methods. A reverse mechanism can be used to determine the position of the base station or access point by determining the propagation delay to a multiple of small cells at different known location and applying similar multilateration procedures. The data for multilateration can be accumulated in time, as the both, the base stations and small cells are fixed. Location information of base stations and/or access points may be subsequently provided to location assistance server 360 and/or mobile device 370 in the network to assist various mobile location technologies (e.g., OTDOA, A-GNSS, etc.).

In the event that the location of a small cell changes during the multilateration procedures, the location assistance server 360 can detect that the location has changed based on changes in the small cell's signature from other existing known or stationary points. Once this detection occurs, the location assistance server 360 can update its database to ignore (e.g., delete) previous data that the small cell observed before the location of the small cell was changed.

Location Assistance Using Crowdsourcing Information

A location assistance server 360 may be configured to interact with devices in the operating environment 300 via a network, so as to assist mobile devices in determining their estimated positions using information from the crowdsourcing server 330. For example, the location assistance server 360 may be configured to calculate and return a position fix for a mobile device that provides signal observations to the location assistance server 360 (e.g., in a "MS-Assisted" mode of operation). Additionally or alternatively, location assistance server 360 may be configured to select regional information from the crowdsourcing server based on a coarse position estimate provided by a mobile device 370, and subsequently provide such regional information to the mobile device 370 in order to enable the mobile device to calculate a finer estimate of its own position (e.g., in an "MS-Based" mode of operation).

While the crowdsourcing server 330 and location assistance server 360 are illustrated in FIG. 3A as being separate servers, in some embodiments, the crowdsourcing server 330 and location assistance server 360 may be combined into a single server that performs any and/or all of the functionalities that each server may provide individually. For example, the crowdsourcing server 330 may, in some embodiments, also provide any and/or all of the functionalities of the location assistance server 360, instead of and/or in addition to the other functionalities provided by the crowdsourcing server 330. In still other embodiments, the functionalities of the crowdsourcing server 330 and/or location assistance server 360 may be provided by any number of different servers and/or other computing devices, which may be located in the same place or in any number of different places.

In one or more arrangements, network 350 may provide connectivity to one or more other wired and/or wireless networks included in operating environment 300. For example, network 350 may be an Internet Protocol (IP) network, such as the Internet. In addition, network 350 may provide connectivity between the crowdsourcing server 330 and the small cell 100.

In one or more arrangements, the network 350 can include a wireless network subsystem, which may include one or more systems and components for providing wireless telephony and data networks, such as one or more gateways, switches, routers, controllers, registers, billing centers, service centers, mobile switching centers, base station controllers, and/or other systems and components. These systems and components may, for example, enable a wireless network subsystem to control one or more wireless base stations, such as macro BS 310, which may transmit and receive radiofrequency signals to and/or from one or more mobile devices on the network(s) provided by wireless network subsystem.

In one or more arrangements, the network 350 can include a broadband network gateway, which may include one or more systems and components for providing wired telephony and data networks, such as one or more gateways, switches, and/or routers, as well as one or more optical, coaxial, and/or hybrid fiber-coaxial lines, one or more satellite links, one or more radio links, and/or other systems and components. These systems and components may, for example, enable a broadband network gateway to provide telephone services and/or data/Internet access to one or more user devices at various locations.

In particular, in addition to observing wireless signals at the operating environment, a small cell 100 also may report information about the observed signals to a crowdsourcing server 330. As illustrated in FIG. 3A, the small cell 100 may report this information to the crowdsourcing server 330 using one or more network connections available to the small cell 100, such as one or more cellular data connections provided by macro BS 310, one or more wireless data connections provided by access point 320, and/or one or more wireline connections (e.g., network 350). For example, the small cell 100 may report information about observed signals using a cellular connection and/or a WLAN connection in some instances, and in other instances, the small cell 100 may report information about observed signals using a broadband connection (e.g., using a broadband connection from the small cell 100 to the crowdsourcing server 330 via network 350). In some embodiments, the small cell 100 may report this information by sending measurement data, as illustrated in the FIG. 2 example, to the crowdsourcing server 330.

By observing wireless signals, a small cell 100 may collect information that can enable a mobile device 370 located at or near the small cell 100 to determine its estimated position. For example, as illustrated in FIG. 3A, a mobile device 370 may be located close to a small cell. If, for instance, the small cell 100 has observed the wireless signals present (e.g., from macro BS 310 and access point 320) and has reported measurement information about these signals back to a crowdsourcing server 330, then when the mobile device 370 is able to detect signals similar to those observed by the small cell 100, the mobile device 370 may be able to determine that it is located at or near the location of the small cell 100. To make this determination, the mobile device 370 may send information to the crowdsourcing server 330 and/or location assistance server 360 describing the signals that the mobile device 370 has detected.

Subsequently, the crowdsourcing server 330 may analyze this information, for instance, by comparing the signals detected by the mobile device 370 with information about observable signals at various locations. The crowdsourcing server 330 may determine, based on the analysis of the signals detected by the mobile device 370 and based on the signals detected at the premise by small cell 100, that mobile device is located at or near the premises. In another arrangement, the crowdsourcing server 330 and/or location assistance server 360 may provide information about observable wireless signals to the mobile device 370, so as to enable the mobile device to analyze and/or compare detected wireless signals with observed wireless signals, and thereby determine its position.

In some embodiments, crowdsourcing server 330 may provide location assistance data to location assistance server 360 enabling various MS-assisted and/or MS-based mobile location technologies. Assistance data provided to the location assistance server 360 may include GNSS Fine time assistance information, which comprises a relationship between cellular network time and GNSS time, location information of base stations and/or access points, and/or PRS signal configuration information. Crowdsourcing server 330 may have determined the above assistance data using measurements provided by the crowdsourcing client 150 in the small cell 100.

As discussed above, a small cell 100 may, in some embodiments, provide information about observed wireless signals to a crowdsourcing server 330 and location assistance server 360, which may enable the crowdsourcing server and/or location assistance server 360 to provide position assistance to mobile devices that may be located at or near the small cell 100. An overview of the processing that may be performed will now be discussed in greater detail with reference to FIGS. 4A-E.

Receiving and Maintaining Information Using Crowdsourcing Server

Figure 4A:
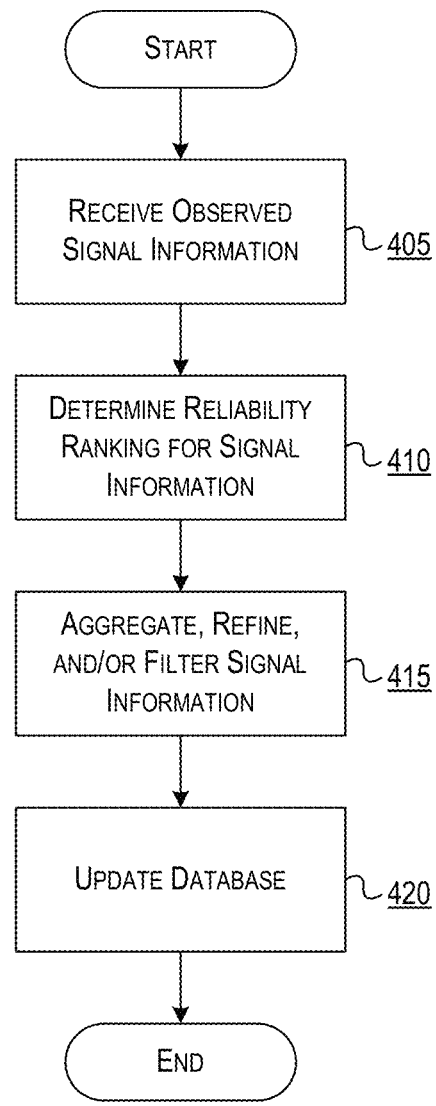
FIG. 4A illustrates an example method of receiving and maintaining information about observed wireless signals according to some embodiments.

In particular, FIG. 4A illustrates an example method of receiving and maintaining information about observed wireless signals according to some embodiments. As seen in FIG. 4A, the method may be initiated in step 405, in which a crowdsourcing server, such as a crowdsourcing server 330, may receive information about one or more observed wireless signals. For example, in step 405, the server may receive a signal observations message, such as the measurement data, as illustrated in the FIG. 2 example, from a small cell. While the examples discussed here involve a crowdsourcing server receiving information about one or more observed wireless signals from a small cell, the crowdsourcing server may likewise receive similar information from one or more other devices that might not be small cells, such as other fixed devices that are capable of and/or configured to observe and report wireless signals, as well as mobile devices that are capable of and/or configured to observe and report wireless signals.

In step 410, the crowdsourcing server may determine a reliability ranking for the signal observation information received in step 405. For example, in step 410, the crowdsourcing server 330 may determine a reliability ranking for the measurement data received in step 405, based on the source of the signal observation information. In instances where the signal observation information is received by the crowdsourcing client 150, such as the measurement data from FIG. 2, the measurement data may include one or more subfields that include information specifying the source.

In some embodiments, the crowdsourcing server may, for instance, be configured to assign a higher reliability ranking to signal observation information that is received from a small cell, and may be further configured to assign a lower reliability ranking to signal observation information that is received from another source, such as a mobile device. In some instances, reliability rankings may be assigned to signal observation information in this way, as small cells may be considered to be more reliable sources of signal observation information than mobile devices and/or other sources of signal observation information. Accordingly, signal observation information that is received from a small cell may be considered to be more reliable and can therefore be assigned a higher reliability ranking. For example, the small cell may also send information identifying the source as a small cell or noting that the data is coming from a stationary source at a known location. The crowdsourcing server and/or location assistance server may give extra weight to data received from a small cell from a known location in comparison to data received from a mobile device which may be moving and/or have an unknown location.

In step 415, the crowdsourcing server may aggregate, refine, and/or filter the received signal observation information and/or may determine various assistance data information from the signal observation information, such as location coordinates of base stations and/or access points for example. For example, in step 415, the crowdsourcing server 330 may combine the received signal observation information (e.g., measurement data) with other signal observation information stored in a server database maintained by the crowdsourcing server 330. In addition, the crowdsourcing server 330 may refine and/or filter the received signal observation information (e.g., by removing and/or otherwise filtering out data points that are considered to be outliers, by executing one or more refinements and/or filter algorithms, by otherwise processing the received signal information, etc.).

In step 420, the server may update the server database in view of the received signal information. For example, in step 420, the crowdsourcing server 330 may store the aggregated, refined, and/or filtered signal observation information and other calculated assistance information in the server database, such that the signal observation information and/or assistance information may be used in the future in assisting other devices in determining their position.

As discussed in greater detail below, there are several ways in which the signal observation information may be used in assisting a mobile device in determining its position. Two examples of how signal observation information may be used in determining positions will now be discussed in greater detail with respect to FIGS. 4B and 4C.

MS-Assisted Mode of Operation

Figure 4B:
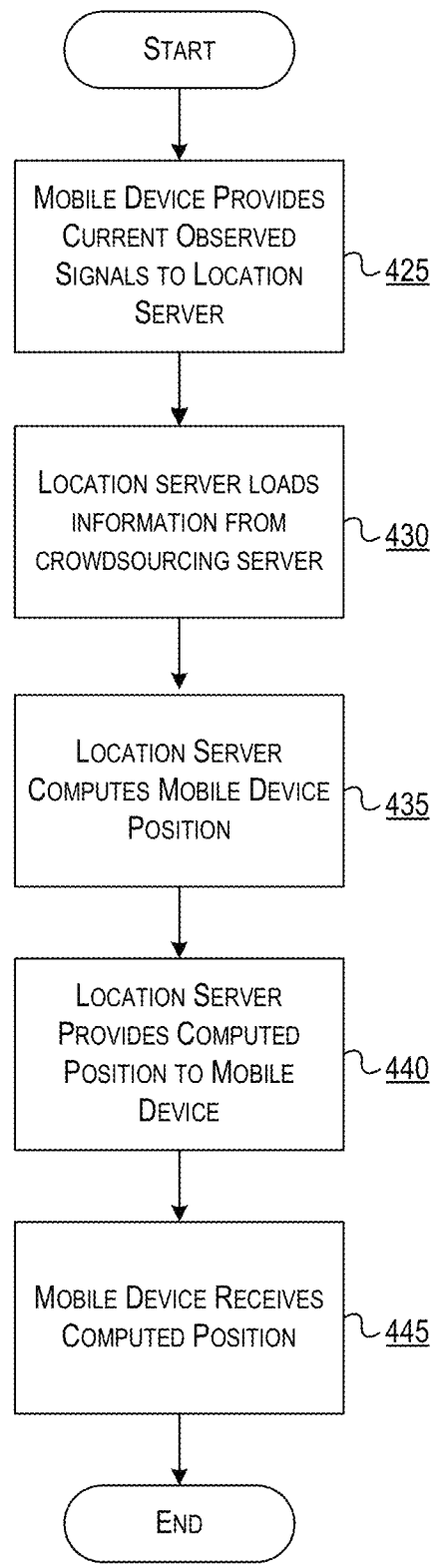
FIG. 4B illustrates an example method of providing calculation assistance to a mobile device in an mobile station (MS)-Assisted mode of operation according to some embodiments.

FIG. 4B illustrates an example method of providing calculation assistance to a mobile device in an MS-Assisted mode of operation according to some embodiments. As illustrated in the discussion below, in an MS-Assisted mode of operation, a mobile device may provide information about the wireless signal(s) that it can observe to a location server, which may then compute the position of the mobile device based on the signal observations, and subsequently return the computed position to the mobile device for use by the mobile device in various applications.

In step 425, a mobile device may provide information describing currently observed wireless signals to a location server. For example, in step 425, mobile device 370 may provide information about the signals that it can currently observe to the location assistance server 360 and/or various measurements derived from the signal observations such as for example, TOA, TDOA, AOA measurements.

In step 430, the location server may load location assistance information from the crowdsourcing server. For example, in step 430, a location assistance server 360 may load information based on the measurement data from the crowdsourcing server 330. In some embodiments, the location assistance server 360 may be configured to request regional information from the crowdsourcing server 330 based on a coarse understanding of the current position of the mobile device 370. Such a coarse understanding of position may, for instance, be determined and/or otherwise obtained based on transmitter information associated with the signal observed by the mobile device (e.g., one or more unique identifiers associated with any and/or all of the transmitters transmitting the observed wireless signals).

In step 435, the location server 330 may compute the position of the mobile device. For example, in step 435, the location assistance server 360 may compute the position of the mobile device 370, based on the information stored in the crowdsourcing server 330 and further based on the one or more wireless signals and/or measurements observed by the mobile device.

In step 440, the location server 330 may provide the computed position to the mobile device. For example, in step 435, the location assistance server 360 may send one or more data messages to a mobile device 370 that indicate and/or otherwise inform the mobile device 370 of its current position.

In step 445, the mobile device may receive the computed position from the location server. For example, in step 445, a mobile device 370 may receive the one or more data messages sent by a location assistance server 360, and subsequently may use the computed position in various applications being executed on and/or otherwise provided by the mobile device.

MS-Based Mode of Operation

Figure 4C:
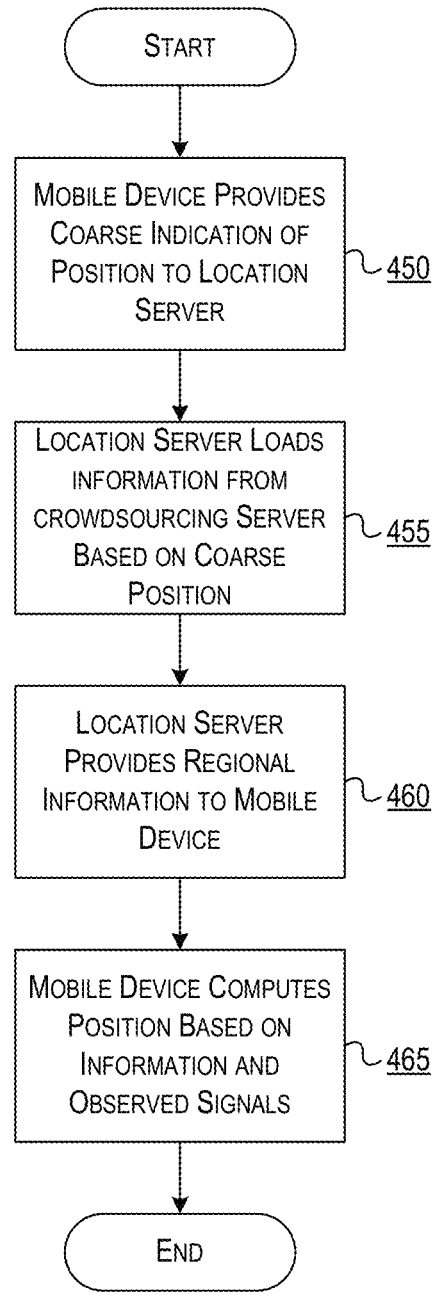
FIG. 4C illustrates an example method of providing position assistance information to a mobile device in an MS-Based mode of operation according to some embodiments.

FIG. 4C illustrates an example method of providing position assistance information to a mobile device in an MS-Based mode of operation according to some embodiments. As illustrated in the discussion below, in an MS-Based mode of operation, a mobile device may provide information about the wireless signal(s) that it can observe to a location server and/or a coarse indication of its current position to the location server, which may then look up (e.g., from the crowdsourcing server) and provide location information to the mobile device, thereby enabling the mobile device to compute its current position for itself.

In step 450, a mobile device may provide a coarse indication of its current position to a location server. Such a coarse indication of position may, for instance, include one or more cell identifications (IDs) that uniquely identify one or more transmitters transmitting wireless signals being observed by the mobile device. For example, in step 445, mobile device 370 may provide a coarse indication of its current position to a location assistance server 360. The coarse indication of position provided may, for instance, include one or more cell IDs corresponding to one or more of macro base station (BS) 310, as this may enable the crowdsourcing and/or location server to identify a particular region in which the mobile device is currently located. According to another embodiment, a hybrid implementation can occur, where the system can get the ID from one or more Access Points 320, rather than from the macro BS 310.

In step 455, the location server may load location information from the crowdsourcing server database. In particular, the location server may load assistance information based on the coarse indication of position provided by the mobile device. For example, in step 455, the location assistance server 360 may communicate with the crowdsourcing server 330 in order to load assistance information corresponding to the region in which the mobile device 370 is currently located (e.g., as identified by the location server based on the cell ID or other coarse indication of position provided in step 450). As discussed above, the assistance information may, for instance, specify various properties of wireless signals that can be observed in the particular region to which the assistance information corresponds as well as location coordinates of base station and/or timing information of base stations (e.g., base station cellular timing relative to GNSS time).

In step 460, the location server may provide the regional assistance information to the mobile device. For example, in step 460, the location assistance server 360 may provide the assistance information obtained from the crowdsourcing server 330 to a mobile device 370. Such assistance information may be sent by the location assistance server 360 to the mobile device 370 via one or more data messages, for instance.

In step 465, the mobile device may compute its current position based on the assistance information obtained from the location server and based on the one or more wireless signals that the mobile device can currently observe. For example, in step 465, the mobile device 370 may compute its current position based on the assistance information received from the location assistance server 360 and based on the properties of the various signals that the mobile device 370 can observe at its current position.

Figure 4D:
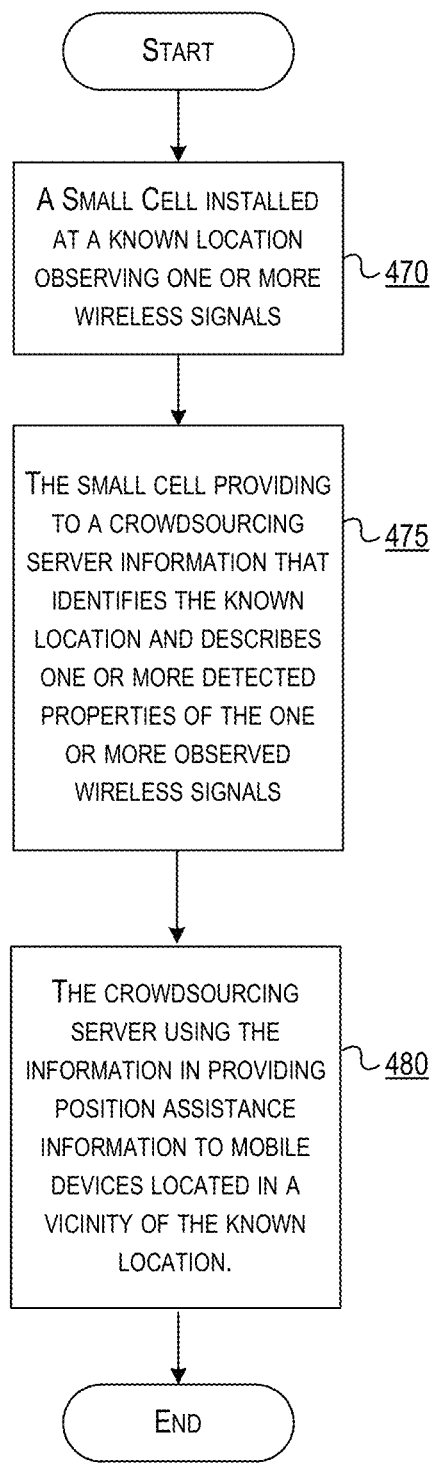
FIG. 4D illustrates an example method of providing position assistance information to a mobile device according to some embodiments.

To recap, FIG. 4D illustrates a simplified example of providing position assistance information to a mobile device according to some embodiments. First, in step 470, A small cell installed at a known location observing one or more wireless signals. Then, in step 475, the small cell providing to the crowdsourcing server information that identifies the known location and describes one or more detected properties of the one or more observed wireless signals. Finally, in step 480, the crowdsourcing server using the information in providing position assistance information to mobile devices located in a vicinity of the known location.

Figure 4E:
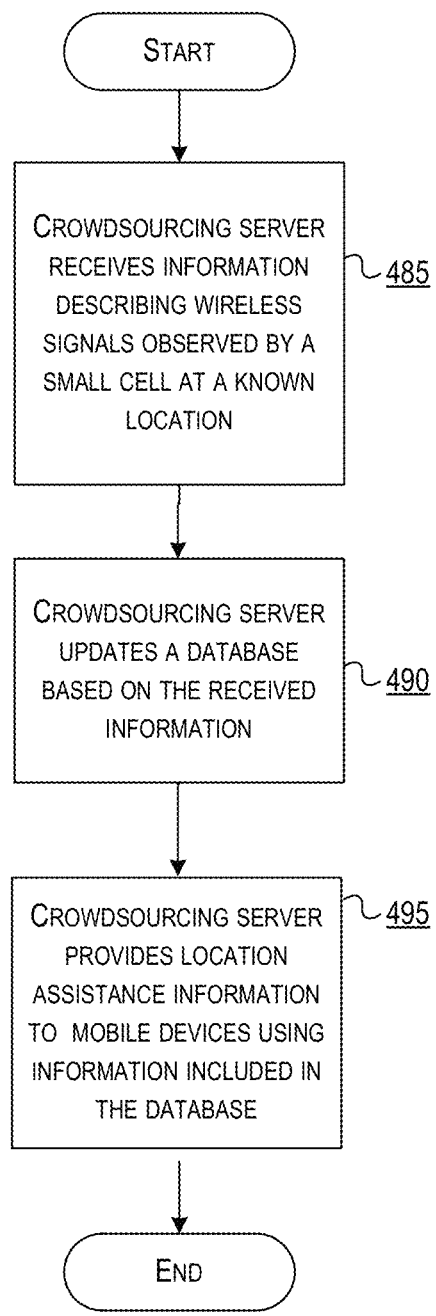
FIG. 4E illustrates an example method of providing position assistance information to a mobile device using a crowdsourcing server according to some embodiments.

As previously described from the architecture diagram in FIG. 3B, FIG. 4E illustrates a method of providing position assistance information to a mobile device 370 using a crowdsourcing server 330 according to some embodiments. First, in step 485, the crowdsourcing server 330 receives information describing wireless signals observed by a small cell 100 at a known location. Then in step 490, the crowdsourcing server 330 updates a database based on the received information. Finally, in step 495, the crowdsourcing server 330 provides location assistance information to mobile devices 370 using information included in the database.

Having described several modes of operation in which location information can be used in providing position assistance functionalities, several examples illustrating how a device can determine a position based on assistance information and information about observed wireless signals will now be discussed.

In some embodiments, for instance, a technique known as "Radio Frequency (RF) Fingerprinting" may be used to determine a location of a device based on location information and information about observed wireless signals. In RF Fingerprinting, a grid of possible locations may be established and an RF signature or fingerprint at each grid point may be defined. The signature may, for instance, include RSSI data for each transmitter observed, or may include both RSSI data and RTT information for each transmitter observed. Thereafter, the location of the mobile device may be calculated by finding the grid point which has a signature that most closely matches the signals observed by the mobile device. This calculation may, for instance, be performed both in an MS-Assisted mode of operation and in an MS-Based mode of operation, as the mobile device may report its observations and a location server may perform the matching involved in RF Finger printing (e.g., in an MS-Assisted mode of operation), or the server may provide a regional fingerprint database to the mobile device, and the mobile device may perform the matching on its own (e.g., in an MS-Based mode of operation).

In some embodiments, another technique known as "Calculated Location" may be used to determine a position of a device based on location information and information about observed wireless signals. In the Calculated Location technique, a server such as crowdsourcing server 330 may attempt to reverse the positions of the wireless transmitters based on the locations and signal observations reported by the various small cells, mobile devices, and other devices observing wireless signals at various locations. Once the transmitter positions are determined, a location (e.g., a location of mobile device 370) may be calculated using various estimation techniques (e.g., by solving ranging equations using RTT and/or TOA information, by calculating a weighted centroid position of transmitters using RSSI to weight transmitter locations, etc.). The particulars of both of these techniques will be readily apparent to one of ordinary skill in the art.

In some embodiments, OTDOA techniques may be used to determine a location of a device, such as mobile device 370. OTDOA is a downlink positioning method standardized in e.g., LTE that exploits time difference measurements conducted on downlink reference signals received from multiple base stations (e.g., macro base stations 310). Although, OTDOA measurements can be performed on a number of downlink signals, Positioning Reference Signals (PRS) have been defined in LTE to allow proper timing and/or ranging measurements of a mobile device from base station signals to improve OTDOA positioning performance.

PRS can be transmitted by a base station in certain positioning sub-frames grouped into positioning occasions. A positioning occasion can comprise for example 1, 2, 4, or 6 consecutive positioning subframes and occurs periodically with 160, 320, 640, or 1280 millisecond intervals for example. Within each positioning occasion, PRS can be transmitted with a constant power. PRS can also be transmitted with zero power (i.e., muted), which can be utilized to avoid measuring in the presence of the strongest interferers.

To further improve hearability of PRS, positioning subframes have been designed as low-interference subframes, that is, without transmission of user data channels. As a result, in ideally synchronized networks, PRSs are only interfered by other cell PRS with the same PRS pattern index (i.e., with the same frequency shift), but not by data transmissions. The frequency shift is defined as a function of the physical cell ID (PCI), resulting in an effective frequency re-use factor of 6, which is further explained below.

Therefore, to achieve good positioning performance, interference coordination of cells is part of the PRS planning strategy, usually carried out by a network operator. The PRS configuration in a network usually remains rather static, and does not change very often. For example, if a new cell is deployed with a new physical cell ID, a re-configuration of PRS parameters may be needed in some parts of the network. A network operator may also change the PRS periodicity based on a tradeoff between current traffic demands and positioning demands.

In OTDOA positioning, a mobile device (e.g., mobile device 370) receives the current PRS configuration parameters in the assistance data, e.g., from a location server. Usually, only a location server owned by the wireless network operator can provide the PRS configuration parameters. This is because the network operator controls the base station parameters and configuration. OTDOA assistance data are defined in the 3GPP LTE Positioning Protocol (LPP) specification 36.355.

In certain embodiments, it may be desired to provide location assistance data also from a location server, such as location assistance server 360, which is not owned or controlled by a network operator which operates or owns the wireless network. Therefore, PRS configuration information needed by mobile devices, such as mobile device 370, can not be provided by the location server, and therefore, OTDOA positioning based on PRS would not be available in such cases.

According to some embodiments, the PRS parameters are determined via small cell crowdsourcing. Crowdsourcing can allow the determination of the PRS info without any direct interaction with the network operator. Therefore, OTDOA location services (e.g., OTDOA assistance data) can also be provided by a location server, which does not belong to the network operator. Therefore, OTDOA location services (e.g., OTDOA assistance data) can be provided for cells belonging to multiple different network operators, and can increase the number of cells available for OTDOA positioning. This can further improve positioning performance.

LTE Positioning Reference Signal (PRS) Example

A more specific example is described to illustrate the advantages of small cells for crowdsourcing information from LTE macrocells. For example small cells through their crowdsourcing client 150 may monitor a 3GPP LTE network downlink signal continuously or periodically, since it is not battery-powered, to obtain measurements needed to derive the necessary information, such as base station locations of the LTE network, timing information (e.g., base station timing relative to GNSS time) and pilot signal configuration. Pilot signal configuration can include LTE Positioning Reference Signal (PRS) structure, muting or idle patterns. The measurement data can then be uploaded to a crowdsourcing server 330 and/or location assistance server 360 for crowdsourced location assistance information. The small cell 100 may autonomously report a new measurement data for the cellular-GNSS time association when the cellular-GNSS time association changed more than a predefined threshold. Similarly, the PRS configuration may change rarely. The small cell 100 may determine the PRS configuration continuously, or periodically, but report a new measurement to the crowdsourcing server 330 when the determined PRS configuration is different compared to the previous report.

For example, crowdsourcing PRS configuration parameters can require long observation times as described further down below, which make the mobile device crowdsourcing approach less desirable or impossible in some cases.

Figure 5:
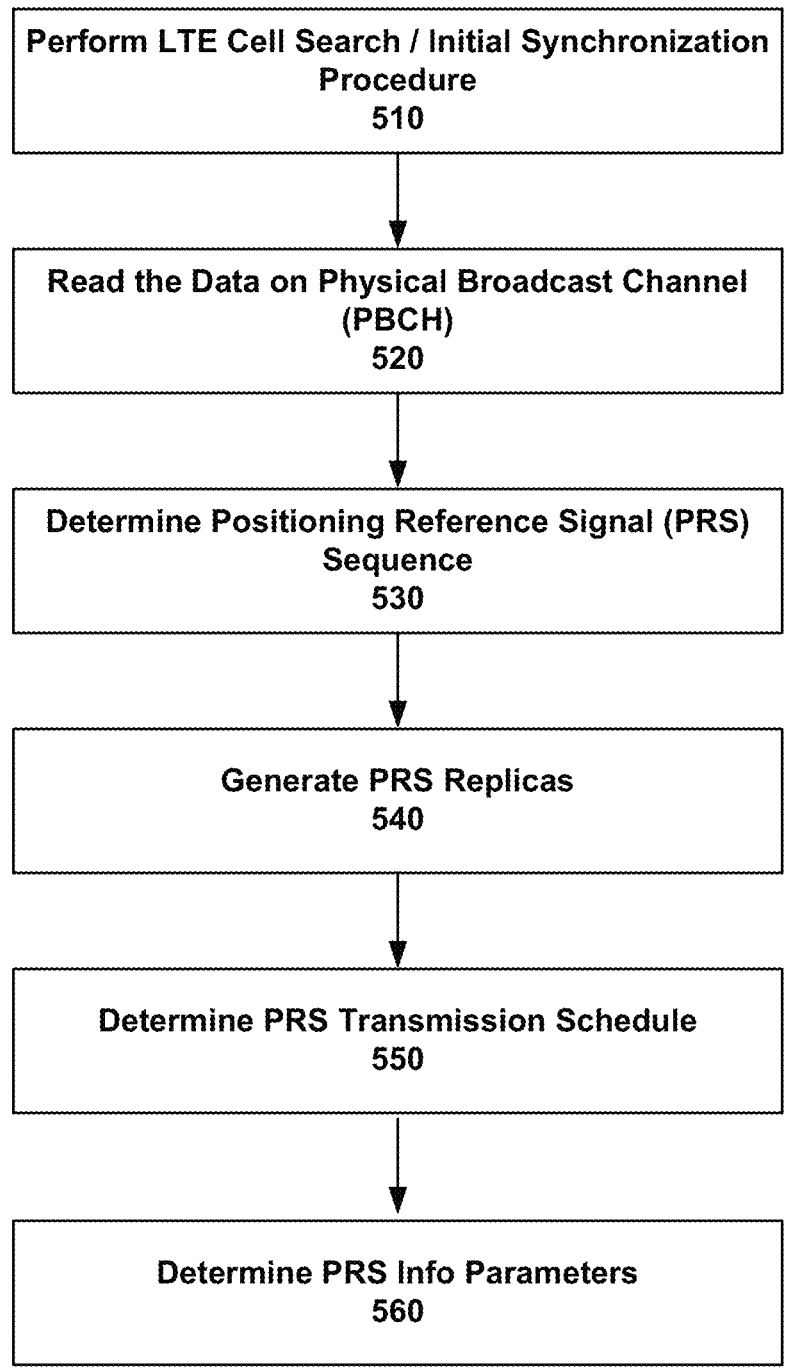
FIG. 5 illustrates an example method outlining the steps for determining the PRS information by listening to LTE downlink signals according to some embodiments.

According to some embodiments, the method for determining the PRS information by listening to LTE downlink signals is shown in FIG. 5. The LTE receiver 143 scans for possible LTE frequencies and performs the following steps for each LTE cell, which is described in more detail further down below:

Step 510: Perform LTE Cell Search/Initial Synchronization procedure using the Primary Synchronization Signal (PSS) and the Secondary Synchronization Signal (SSS);

Step 520: If initial synchronization procedure was successful, proceed to decode the Physical Broadcast Channel (PBCH);

Step 530: Determine PRS sequence, potentially transmitted by that cell;

Step 540: Generate reference signal replicas;

Step 550: Determine PRS transmission schedule; and

Step 560: Determine PRS Info Parameters.

It should be noted that a macro cell cannot perform any of these steps listed above. The network listen receiver 140 can performs steps 510 and 520. The remaining steps are specifically designed in the small cell (e.g., PRS information determination module 160, crowdsourcing client 150) to learn the PRS information.

Positioning Reference Signals (PRS) Info Determination Module

As shown in FIG. 1, the small cell 100 may also include a PRS information determination module 160. According to some embodiments, the PRS information determination module 160 can determine the signal structure of PRS transmitted by the monitored 3GPP LTE network. According to another embodiment, the PRS information determination module 160 can reside in the crowdsourcing client 150.

The PRS configuration as provided in the OTDOA assistance data includes the following parameters, as described in 3GPP specification 36.355, section 6.5.1.2. Table 1 illustrates the PRS parameters for a PRS configuration:

TABLE 1

| | |
|---|---|
| PRS Bandwidth | Defines the bandwidth that is used for the PRS. 1.4, 3, 5, 10, 15, and 20 MHz bandwidth is possible, which corresponds to 6, 15, 25, 50, 75, and 100 LTE resource blocks. |
| PRS Configuration Index $I_{PRS}$ | Defines the PRS periodicity and the PRS offset. |
| Number of PRS subframes | Defines the number of consecutive subframes $N_{PRS}$ which includes the PRS. 1, 2, 4, 6, or 8 subframes are possible. |
| PRS Muting Info | Defines the PRS muting configuration. |

FIG. 5 illustrates an example method outlining the steps 500 for determining the PRS info by listening to LTE downlink signals. The network listen receiver 140 (e.g., LTE receiver 143) can scan for possible frequencies (e.g., LTE frequencies) and can perform the following steps for each e.g., macro BS 310 (e.g., LTE cell) within range.

At step 510, the network listen receiver 140 can perform an LTE cell search and initial synchronization procedure. For example, in step 510, the network listen receiver 140 can listen for the Primary Synchronization Signal (PSS) and the Secondary Synchronization Signal (SSS). For example, the detection of the PSS and SSS can enable time and frequency synchronization; provides the small cell with the physical Cell-ID; provides the small cell with the cyclic prefix length; and informs the small cell whether the macro BS 310 (e.g., LTE cell) uses Frequency Division Duplex (FDD) or Time Division Duplex (TDD).

After step 510, the small cell can obtain the physical ID of the base station, the cyclic prefix lengths and data indicating whether the base station uses TDD and FDD, among other potential information. Therefore, the small cell can have the basic system information and can begin decoding the broadcast channel information (e.g., physical broadcast channel (PBCH)). From this decoding, the small cell can obtain additional information (e.g., bandwidth of the cell, system frame number (SFN)) and know how many antenna ports the base station has.

A conventional mobile device normally performs step 510, but a small cell (e.g., LTE receiver 143) can be configured to perform step 510 in order to determine required parameters which define the details of the PRS sequence the base station transmits. The PRS configuration depends among others on the physical cell ID which was determined in step 510, the TDD/FDD mode and how many antenna ports are used to define the PRS sequence in step 530.

Once the initial synchronization procedure in step 510 is completed, the process proceeds to decode the Physical Broadcast Channel (PBCH), as shown in step 520. For example, step 520 allows the LTE receiver 143 to obtain system information, which is carried in the master information block (MIB) of the LTE cell. For example, the system information can include: downlink system bandwidth; physical hybrid ARQ indicator channel (PHICH) configuration of the LTE cell; system frame number (SFN); and number of transmit antenna ports.

Next, in step 530, the PRS information Determination module 160 in small cell 100 can determine the PRS sequence transmitted from each LTE cell. For example, the reference-signal sequence $r_{l,n_s}(m)$ is defined by the 3GPP specification 36.211, section 6.10.4.1:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$m=0, 1, \ldots 2N_{RB}^{max,DL}-1$, where
- $n_s$ is the slot number within a radio frame (slot=0.5 ms; frame=10 ms), $n_s=0, 1, 2 \ldots 19$;
- l is the OFDM symbol number within the slot; l=0, 1, 2, ... 6 for normal cyclic prefix; l=0, 1, 2, ... 5 for extended cyclic prefix;
- c(i) is a length-31 Gold code sequence as defined in 3GPP Specification 36.211, section 7.2;
- $N_{RB}^{max,DL}$ is the largest downlink bandwidth configuration, expressed in multiples of $N_{sc}^{RB}$;
- $N_{sc}^{RB}$ the resource block size in the frequency domain, expressed as a number of subcarriers; and
- $N_{sc}^{RB}=12$ subcarriers for PRS, with 15 kHz spacing and 180 kHz total.

The pseudo-random sequence generator for c(i) is initialized at the start of each OFDM symbol with:

$c_{init}=2^{10} \cdot (7 \cdot (n_s+1)+l+1) \cdot (2 \cdot N_{ID}^{cell}+1)+2 \cdot N_{ID}^{cell}+N_{CP}$,
where $$N_{CP} = \begin{cases} 1 & \text{for normal Cyclic Prefix} \\ 0 & \text{for extended Cyclic Prefix} \end{cases}$$

$N_{ID}^{cell}$ Physical layer cell identity.

Therefore, in this example, all parameters needed to determine the PRS sequence, which is $r_{l,n_s}(m)$, can be obtained from steps 510 and step 520:
- $n_s$, l Frame/slot timing is known after initial synchronization (step 510);
- $N_{ID}^{cell}$ is known after initial synchronization (step 510);
- $N_{CP}$ is known after initial synchronization (step 510);
- $N_{RB}^{max,DL}$ is known after decoding the PBCH (step 520).

Then in step 540, the small cell can generate reference signal replicas. According to some embodiments, the reference signal sequence, $r_{l,n_s}(m)$, is generated for each slot in a radio frame (e.g., 20 reference signal replicas are generated for each of the 20 slots). For example, the reference signal sequence can be mapped to complex-valued QPSK modulation symbols used as reference signals for an antenna port p in a slot according to 3GPP specification 36.211, section 6.10.4.2:

$a_{k,l}^{(p)}=r_{l,n_s}(m')$, where, for normal cyclic prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (1 \text{ or } 2 \, PBCH \text{ antenna ports}) \\ 2, 3, 5, 6 & \text{if } n_s \bmod 2 = 1 \text{ and } (4 \, PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

extended cyclic prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \, PBCH \text{ antenna ports}) \\ 2, 4, 5 & \text{if } n_s \bmod 2 = 1 \text{ and } (4 \, PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}.$$

In this example, the bandwidth for positioning reference signals is $N_{RB}^{PRS}$ and the cell-specific frequency shift is given by $v_{shift} = N_{ID}^{cell} \bmod 6$.

As previously mentioned, all the parameters needed to map the reference signal sequence $r_{l,n_s}(m)$ to complex valued modulation symbols $a_{k,l}^{(p)}$ are obtained from step 510 and step 520, wherein $a_{k,l}^{(p)}$ is the value of the resource element for antenna port p, and wherein (k,l) specifies the resource element with frequency-domain index k and time-domain index l:

cyclic prefix length is known after step 510;
number of transmit antenna ports (e.g., 1 or 2, 4) is known after step 520;
$v_{shift}$, cell specific frequency shift, which is based on the physical Cell-ID, is known after step 510;
The bandwidth for positioning reference signals $N_{RB}^{PRS}$ is assumed to be the system bandwidth $N_{RB}^{DL}$, which is known after step 520. If this is not the case, see examples illustrated by FIGS. 11-12.

Figure 6A:
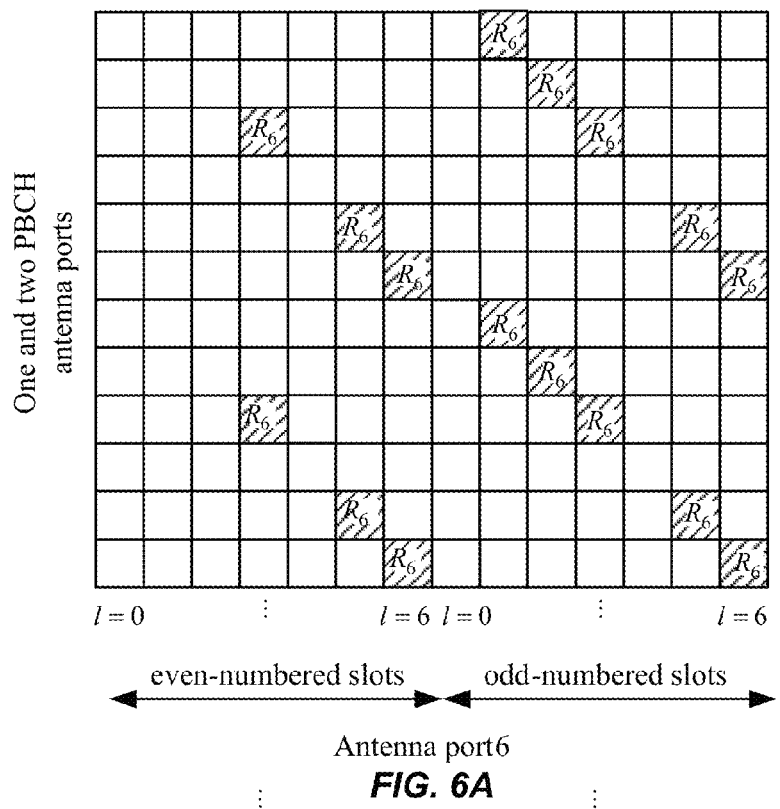
FIG. 6A illustrates the mapping of positioning reference signals to resource elements for a normal cyclic prefix for one-or-two transmit antenna ports according to some embodiments.
Figure 6B:
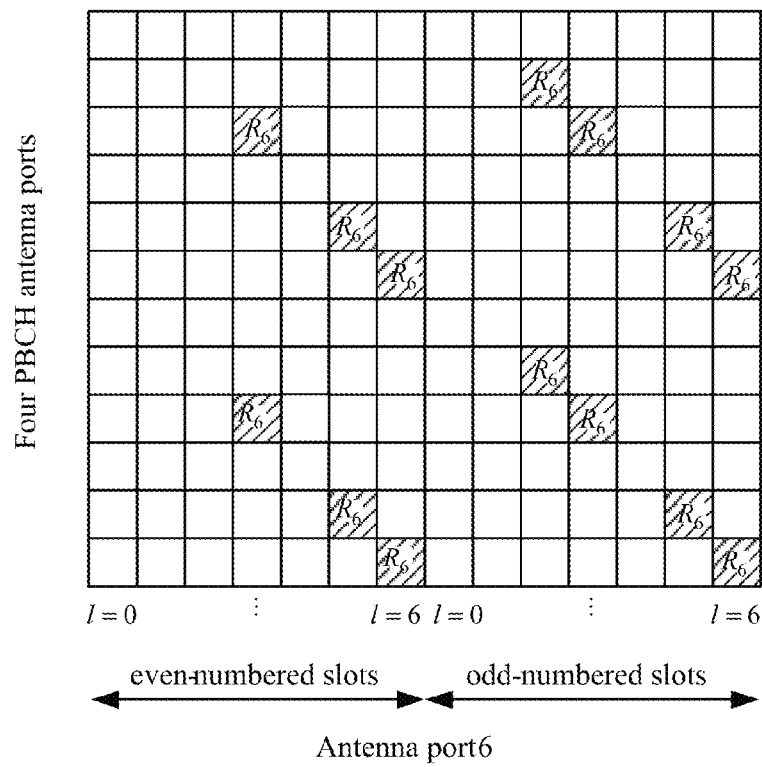
FIG. 6B illustrates the mapping of positioning reference signals to resource elements for a normal cyclic prefix for four transmit antenna ports according to some embodiments.

FIG. 6A and FIG. 6B illustrate the mapping of positioning reference signals to resource elements for a normal cyclic prefix according to some embodiments. FIG. 6A illustrates the mapping for one or two transmit antenna ports, and FIG. 6B illustrates the mapping for four transmit antenna ports.

Figure 7A:
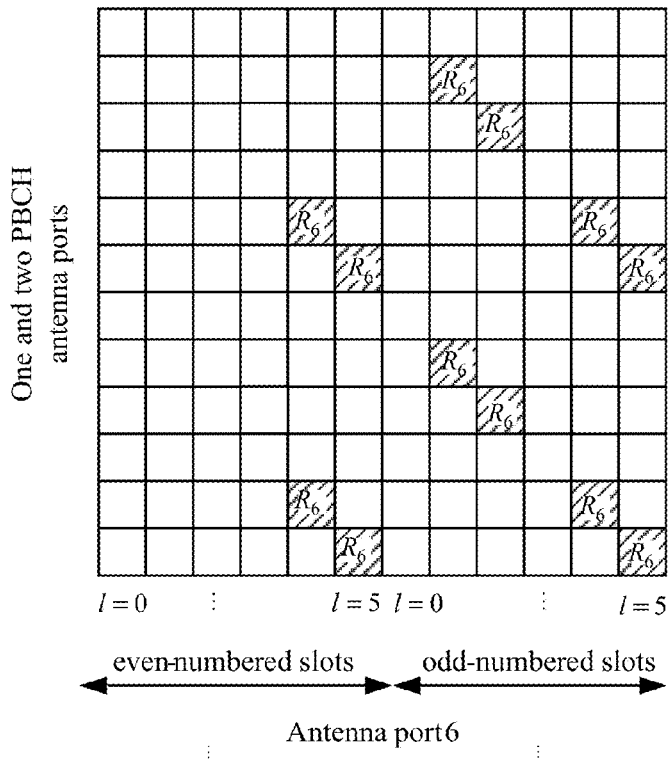
FIG. 7A illustrates the mapping of positioning reference signals to resource elements for an extended cyclic prefix for one-or-two transmit antenna ports according to some embodiments.
Figure 7B:
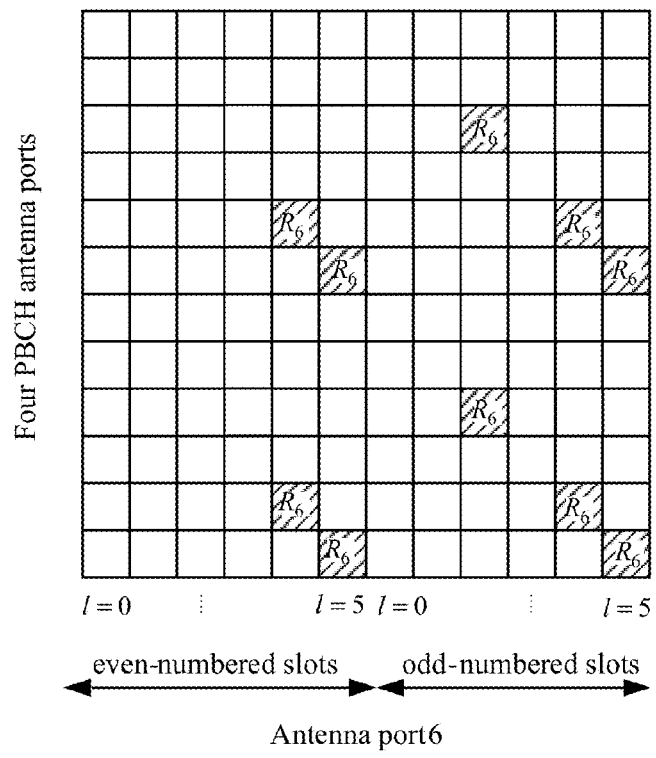
FIG. 7B illustrates the mapping of positioning reference signals to resource elements for an extended cyclic prefix for four transmit antenna ports according to some embodiments.

FIG. 7A and FIG. 7B illustrate the mapping of positioning reference signals to resource elements for an extended cyclic prefix according to some embodiments. FIG. 7A illustrates the mapping for one-or-two transmit antenna ports, and FIG. 7B illustrates the mapping for four transmit antenna ports.

The squares in FIG. 6A-7B can represent a resource element with frequency-domain index k and time-domain index l. For example, the squares labelled $R_6$ can indicate PRS resource elements within a block of 12 subcarriers over 14 or 12 OFDM symbols, respectively. Additionally, the white squares can illustrate subcarriers which do not contain any signal or data.

In step 540, a replica signal can be generated for each slot or subframe within a 10-millisecond radio frame (e.g., for 10 subframes/20 slots).

Figure 8:
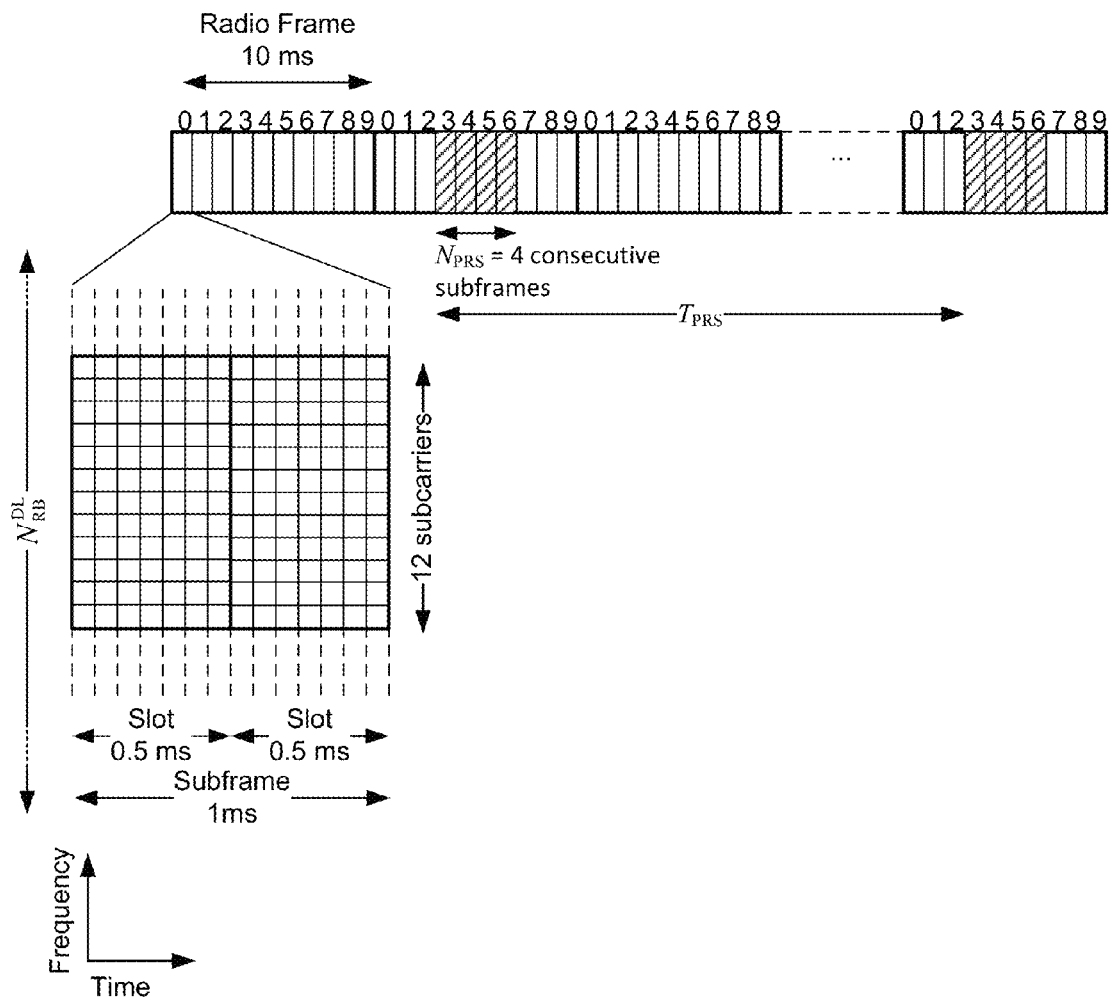
FIG. 8 illustrates an example of positioning occasions with $N_{PRS}=4$ subframes, separated by $T_{PRS}$ subframes according to some embodiments.

Once the replica signals have generated, the PRS Information Determination module 160 determines the PRS transmission schedule, at step 550. For example, PRSs are transmitted in pre-defined positioning subframes grouped by several consecutive subframes $N_{PRS}$, also known as positioning occasions. Positioning occasions can occur periodically with a certain periodicity $T_{PRS}$. The period $T_{PRS}$ is defined in 3GPP specification 36.211 and can be 160, 320, 640, or 1280 subframes or milliseconds, and the number of consecutive subframes $N_{PRS}$ can be 1, 2, 4, or 6 subframes. To illustrate, FIG. 8 shows an example of positioning occasions with $N_{PRS}=4$ subframes, separated by $T_{PRS}$ subframes.

Figure 9:
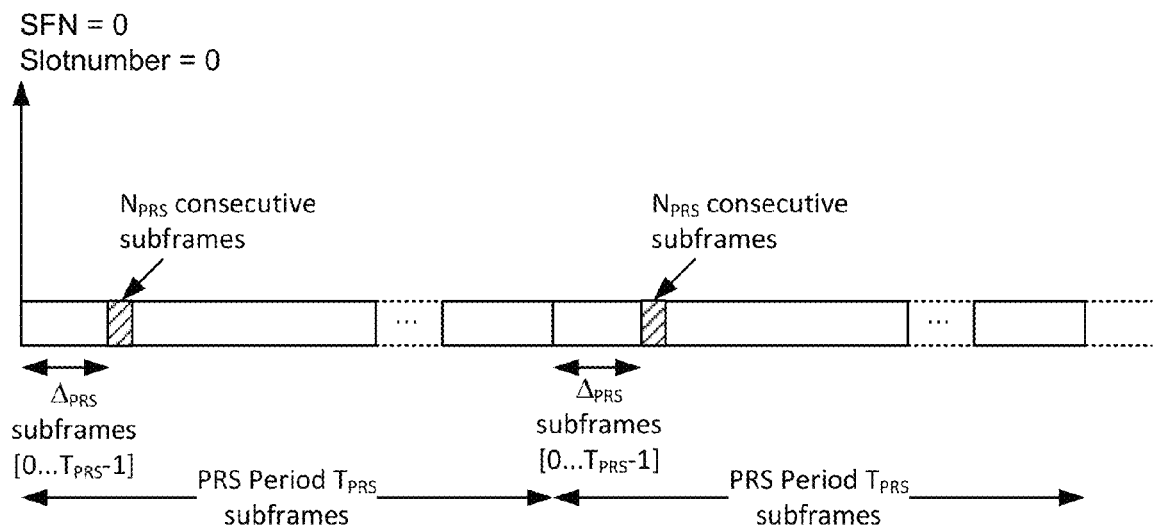
FIG. 9 illustrates an example of the cell specific subframe offset, which defines the starting subframe of PRS transmission relative to system frame number SFN=0 according to some embodiments.

FIG. 9 illustrates an example of the cell specific subframe offset $\Delta_{PRS}$, which defines the starting subframe of PRS transmission relative to SFN=0. The $\Delta_{PRS}$ is the third parameter that characterizes the PRS transmission schedule. Additionally, the $\Delta_{PRS}$ can be inferred relative to the beginning of each PRS period $T_{PRS}$. Furthermore, the parameters $T_{PRS}$ and $\Delta_{PRS}$ can be derived from the PRS Configuration Index $I_{PRS}$, as specified in 3GPP specification 36.211, section 6.10.4.3. Table 2 illustrates the association between $T_{PRS}$, $\Delta_{PRS}$ and $I_{PRS}$.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-4095 | | Reserved |

For example, for the first subframe of the $N_{PRS}$ downlink subframes, the positioning reference signal instances can satisfy $(10 \times n_f + \lfloor n_s/2 \rfloor - \Delta_{PRS}) \bmod T_{PRS} = 0$, where $n_f$ is the system frame number (SFN), and $n_s$ is the slot number within a radio frame.

Figure 10:
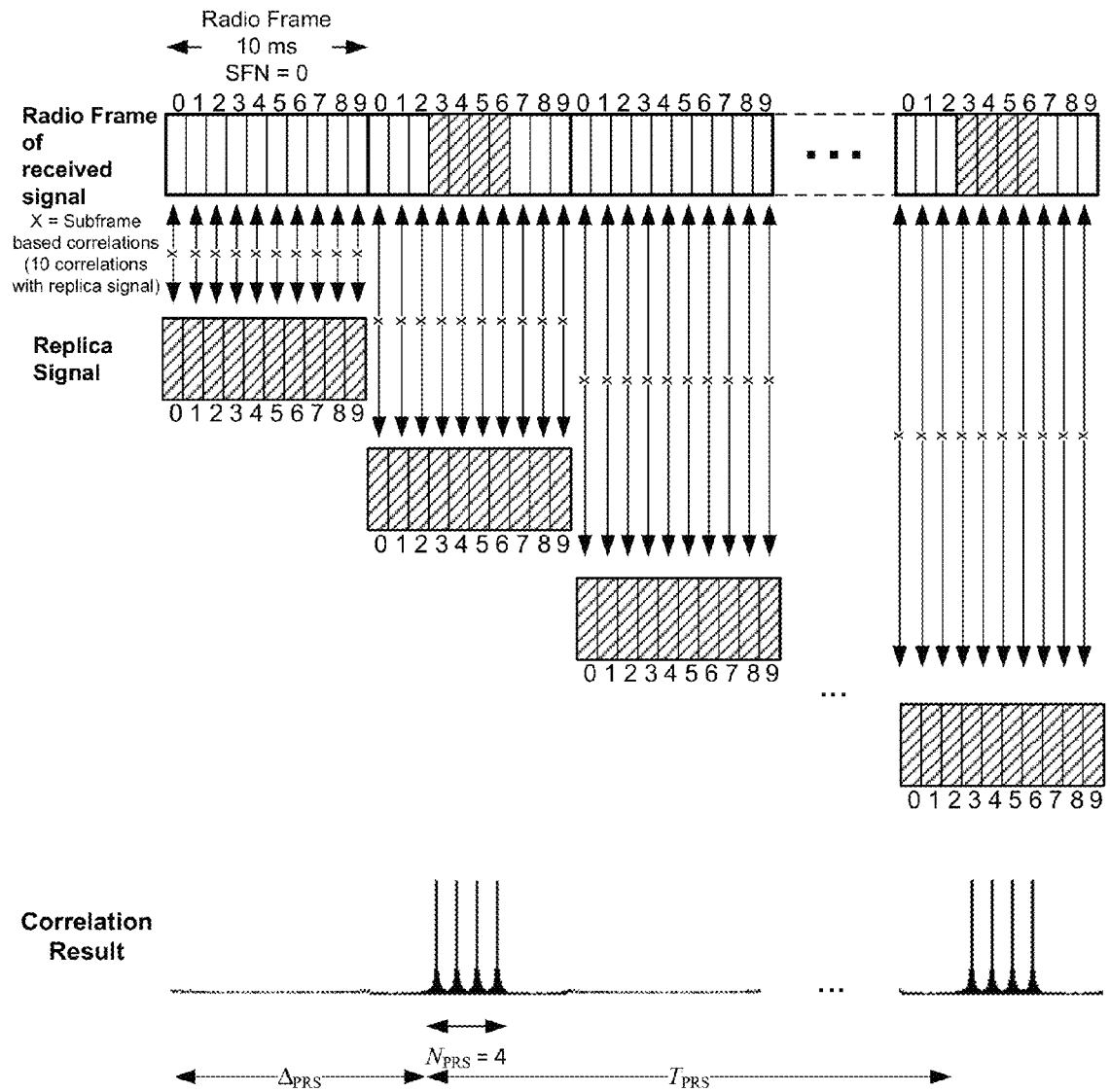
FIG. 10 illustrates an example of the determination of the PRS transmission schedule based on correlating the received signal frame with the replica signal generated according to some embodiments.

Therefore, as illustrated in FIG. 10, the determination of the PRS transmission schedule can be based on correlating the received signal frame with the replica signal generated in step 540. For example, each subframe of the received radio frame can be correlated with the corresponding replica subframe (i.e., 2 slots coherent accumulation) generated at step 540, resulting in 10 correlation results per frame. According to one embodiment, the process can start with the received radio frame with SFN=0 to easily determine the PRS subframe offset $\Delta_{PRS}$. Given that the SFN in LTE can run from 0 to 1023, this can correspond to a 10.23 seconds SFN cycle. For example, as illustrated at the bottom of FIG. 10, if a PRS is transmitted in a particular subframe, the correlation result would show a strong peak, if there is no PRS transmitted in that particular subframe, the correlation result would be essentially zero. According to some embodiments, the correlations can be performed at least for twice the maximum PRS periodicity of $T_{PRS}$, which is equal to 2×1280 ms, to be able to determine $\Delta_{PRS}$ and $T_{PRS}$ for the longest possible PRS periodicity of 1280 ms. Furthermore, the correlations can be performed continuously, to reliably detect the transmission schedule, and to detect any possible changes in the PRS transmission.

For example, the small cell can perform step 550 for a long enough time and conclude that the base stations are transmitting PRSs and not just regular user traffic.

Unlike a mobile device, the small cell has the ability to perform these steps. Additionally, since the location of the monitored (e.g., macro) cell and small cell do not change often, a re-synchronization (e.g., steps 510 and 520) is not needed once the timing of the monitored cell has been determined Steps 510 and 520 can be performed periodically (e.g., once or twice per day) in order to detect any changes in the cell timing or physical cell ID.

Therefore, based on the correlation results, as illustrated in FIG. 10, the PRS parameters can be determined. For example, the first subframe where the first correlation peak occurs (relative to SFN=0) determines the PRS subframe offset $\Delta_{PRS}$ (in subframes). Additionally, the number of consecutive subframe correlation peaks determines the length of the positioning occasion ($N_{PRS}$). Furthermore, the recurrence of the correlation peak group determines the PRS periodicity $T_{PRS}$, in subframes. After determining the $T_{PRS}$ and $\Delta_{PRS}$, the PRS configuration Index ($I_{PRS}$) can then be obtained using table 2. For example, if it is determined that $\Delta_{PRS}$=50 and the $T_{PRS}$=320, then $I_{PRS}$ is 50+160=210.

The correlation process as described in step 540 can be performed continuously in order to reliably detect the parameters $N_{PRS}$ and $I_{PRS}$. This can prevent the parameter from being determined based on a single snapshot.

After the small cell determines the PRS transmission schedule in step 550, the small cell then determines the PRS information parameters in step 560. According to some embodiments, after step 550, the parameters needed to describe the PRS configuration, with the exception of the muting parameters, have been determined by the PRS information determination module 160 in the small cell 100 and can be delivered to the crowdsourcing client 150.

According to some embodiments, the procedure described in the steps 500 above assumes that PRSs are transmitted over the whole LTE system bandwidth, which is normal practice. However, this is not required by the 3GPP LTE standards, and the PRS transmission bandwidth may actually be smaller than the LTE system bandwidth. Therefore, the PRS information determination module 160 may need to determine or verify the PRS transmission bandwidth.

As previously mentioned, the possible PRS transmission bandwidth comprises 6, 15, 25, 50, 75, or 100 resource blocks. Therefore, in order to determine or verify the assumed PRS bandwidth, the correlations described in step 550 are performed for each possible bandwidth.

For example, if the LTE system bandwidth, as determined in step 520, indicates 50 resource blocks, the correlations can be performed with replica signals generated for 6, 15, 25 and 50 resource blocks. Therefore, according to this example, for each subframe, four correlations are performed. Additionally, the replica signals for each subframe at step 530 and step 540 can be generated for each possible PRS bandwidth. Furthermore, the subframe correlations at step 550 can be performed with each possible replica signal.

Figure 11:
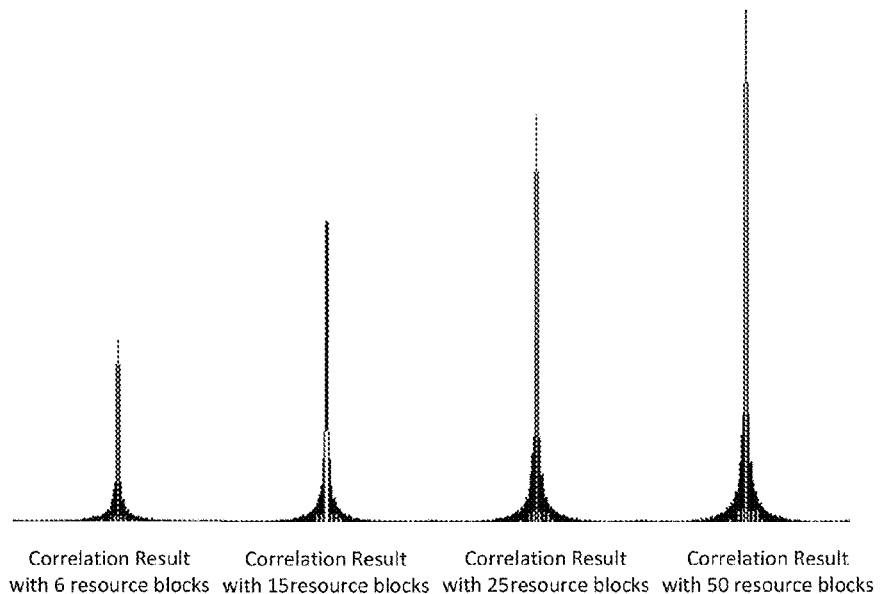
FIG. 11 illustrates an example of the correlation results for one PRS subframe, under the assumption that there are 50 resource blocks for the PRS according to some embodiments.

As illustrated in the example in FIG. 11, if the PRSs are transmitted over the whole assumed bandwidth, which is 50 resource blocks in this example, the correlation results for the PRS subframes can increase coherently. FIG. 11 illustrates the correlation results for one PRS subframe, under the assumption that there are 50 resource blocks for the PRS. For each subframe the correlation is performed with a replica signal of 6, 15, 25, and 50 resource blocks. Given that the received PRS signal is 50 resource blocks in this example, the correlation results increase coherently with the increased replica bandwidth. Therefore, in this example, it would be determined that the PRS transmission bandwidth is indeed 50 resource blocks.

Figure 12:
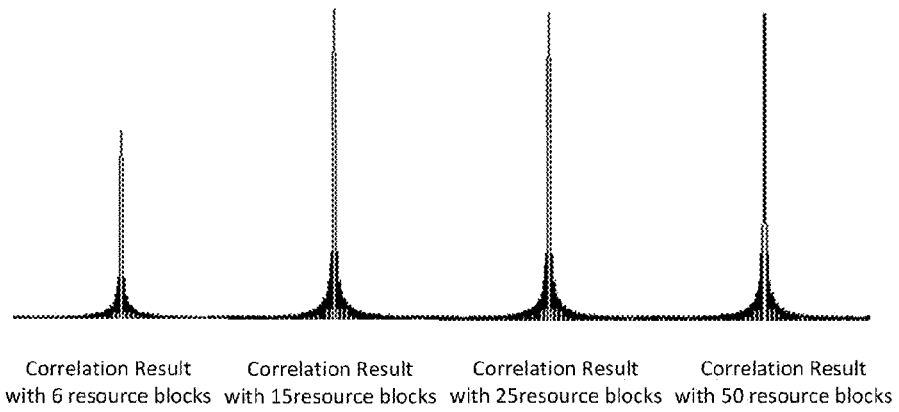
FIG. 12 illustrates an example where the system bandwidth of the received signal is 50 resource blocks, but the PRS occupy only 15 resource blocks according to some embodiments.

FIG. 12 illustrates an example where the system bandwidth of the received signal is 50 resource blocks, but the PRSs occupy only 15 resource blocks. The correlations can be performed as previously described, wherein there are four correlations for each subframe with different replica PRS bandwidth. According to this example, the correlation does not increase when the correlations are performed with replica PRS bandwidth of 25 and 50 resource blocks. Therefore, it would be determined that the PRS transmission bandwidth is only 15 resource blocks in this example, even though the total system bandwidth is 50 resource blocks.

As can be understood from the described examples, the complexity in the case of unknown PRS transmission bandwidth increases considerably, since multiple correlations per subframe need to be performed, each with a different assumption about the transmitted PRS bandwidth. Therefore, using small cells for this crowdsourcing approach is ideal because the additional complexity could be easily handled (e.g., within the PRS information determination module 160) without affecting the small cell's intended operation.

PRS Muting Pattern

As previously described, the PRSs in the individual positioning occasions are transmitted with constant power. Usually, the power is the same as for the other signals within the downlink resource blocks, but an operator may also decide to increase the PRS power to improve hearability, also known as PRS power boosting. However, as the PRS power increases, the PRS interference also increases.

Alternatively, another approach for increasing hearability is the PRS muting approach, where the PRSs in certain positioning occasions are transmitted with zero power. For example, when the strong PRS signal is muted by the serving base station, the weak PRS signals from the neighbor base stations with the same frequency shift can be more easily detected by the mobile device.

According to 3GPP specification 36.355, the PRS muting configuration of a cell is defined by a periodic muting sequence with periodicity $T_{REP}$, where $T_{REP}$ counted in number of PRS positioning occasions can be 2, 4, 8, or 16. Furthermore, the PRS muting info is represented by a bit string of length 2, 4, 8, or 16 bits, which correspond to the selected $T_{REP}$. Additionally, each bit in this bit string can have the value "0" or "1." Therefore, if a bit in the PRS muting info is set to "0", then the PRS is muted in the corresponding PRS positioning occasion.

Figure 13:
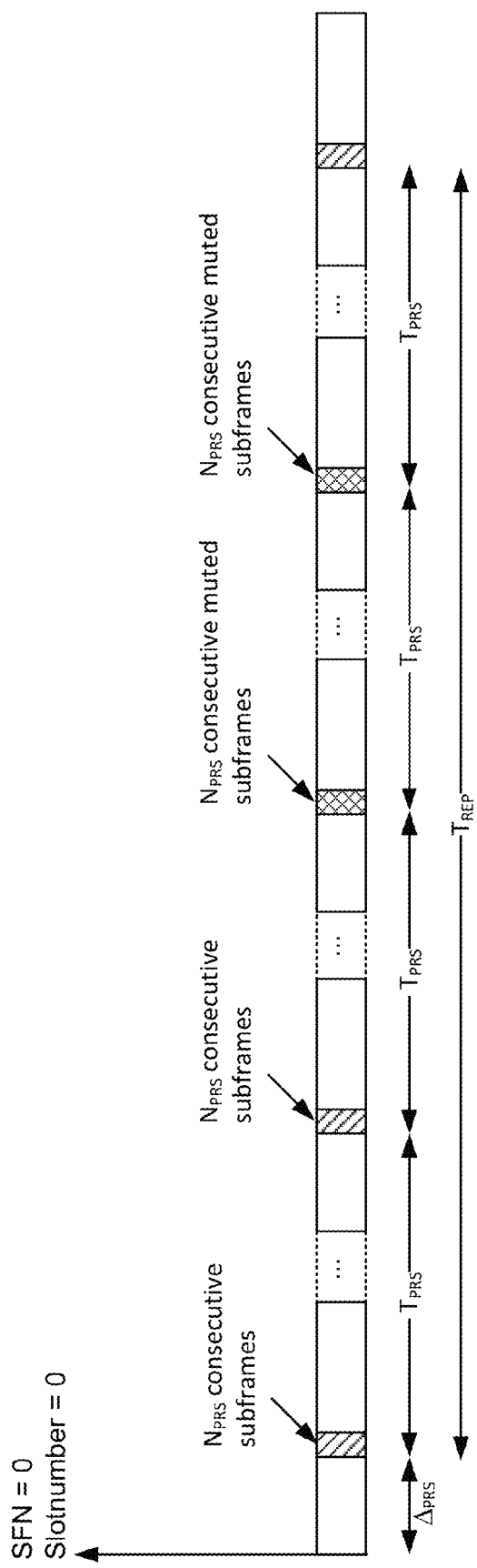
FIG. 13 illustrates an example of PRS muting pattern with $T_{REP}$ of four positioning occasions according to some embodiments.

FIG. 13 illustrates an example of a PRS muting pattern with $T_{REP}$ of four positioning occasions. For this example, the positioning occasions with the cross-stitched pattern marking are muted. Therefore, the corresponding PRS muting bit string would be '1100.'

For example, when the positioning occasion is muted, the correlation results determined by the method in step 550 can equal zero at the muted positioning occasion.

As illustrated in FIG. 13, muting patterns can typically have a structure consisting of muted and non-muted positioning occasions (e.g., '1100', '11110000'). For this example, the small cell can detect the consecutive positioning occasions using the method previously described in order to determine the $T_{PRS}$, and the gaps between them, and therefore the small cell can determine $T_{REP}$.

Alternatively, ambiguities may occur with muting patterns with alternating '0's and '1's (e.g., '101010'). When ambiguities do occur, the method may not be able to determine the muting pattern, but may instead detect a $T_{PRS}$ which is twice the length of the true $T_{PRS}$. According to some embodiments, these ambiguities may be resolved at the crowdsourcing server 330 by comparing the detected PRS information with available PRS information of neighbor cells.

Given that the PRS in a network can be synchronized and coordinated, by comparing the PRS information for a group of cells, the crowdsourcing server 330 can determine if a particular positioning occasion is muted. For example, when the PRS of a cell is muted, the PRS of a neighbor cell, with the same PRS frequency shift, may not be muted.

Figure 14:
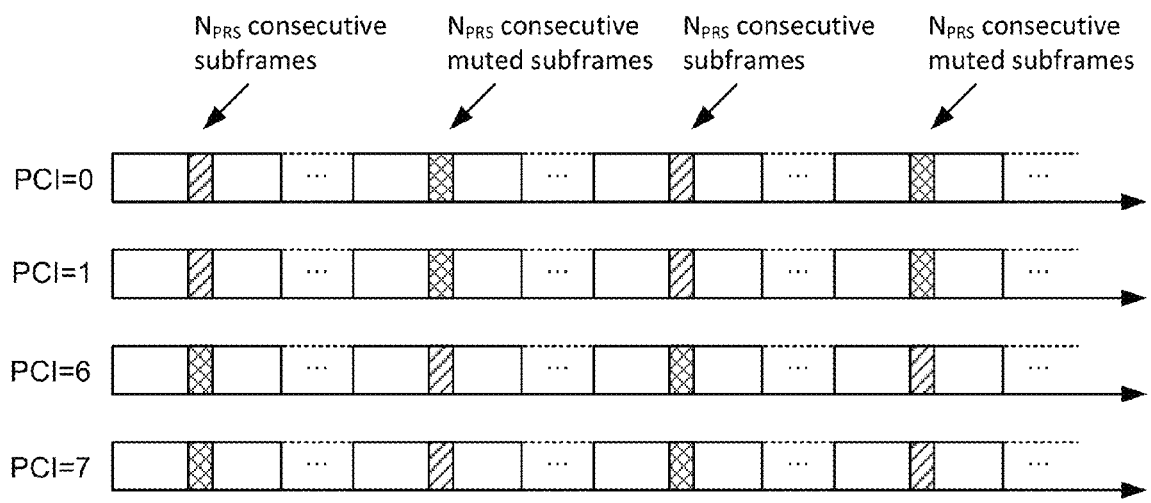
FIG. 14 illustrates an example of a group of four cells with alternating muting patterns according to some embodiments.

To illustrate this example, FIG. 14 shows a group of four cells with alternating muting patterns (e.g., '10' or '01'). The PRS information detected by each individual observed cell may show a wrong $T_{PRS}$ (e.g., a $T_{PRS}$ between non-muted positioning occasions), because the muted positioning occasion in-between would not be detected. However, by looking at the group of cells, the crowdsourcing server 330 can determine whether there are muted positioning occasions in-between, since not all cells in a neighbor group are muted at the same time.

However, from a mobile device point of view, both instances of PRS information received in assistance data are equivalent. This is because the purpose of the PRS information is to provide assistance data to the mobile device. The PRS information informs the mobile device when a PRS occurs in order to measure a TOA. Therefore, the PRS configuration shown in FIG. 14 can be determined without muting information, as long as the $T_{PRS}$ and the $\Delta_{PRS}$ are known (e.g., using the steps 500 associated with table 2). Furthermore, the mobile device does not need to know that a neighboring PRS is muted, because the mobile device can just see interleaved non-muted positioning occasions (for example, different PRS information parameters for various neighbor cells).

Figure 15:
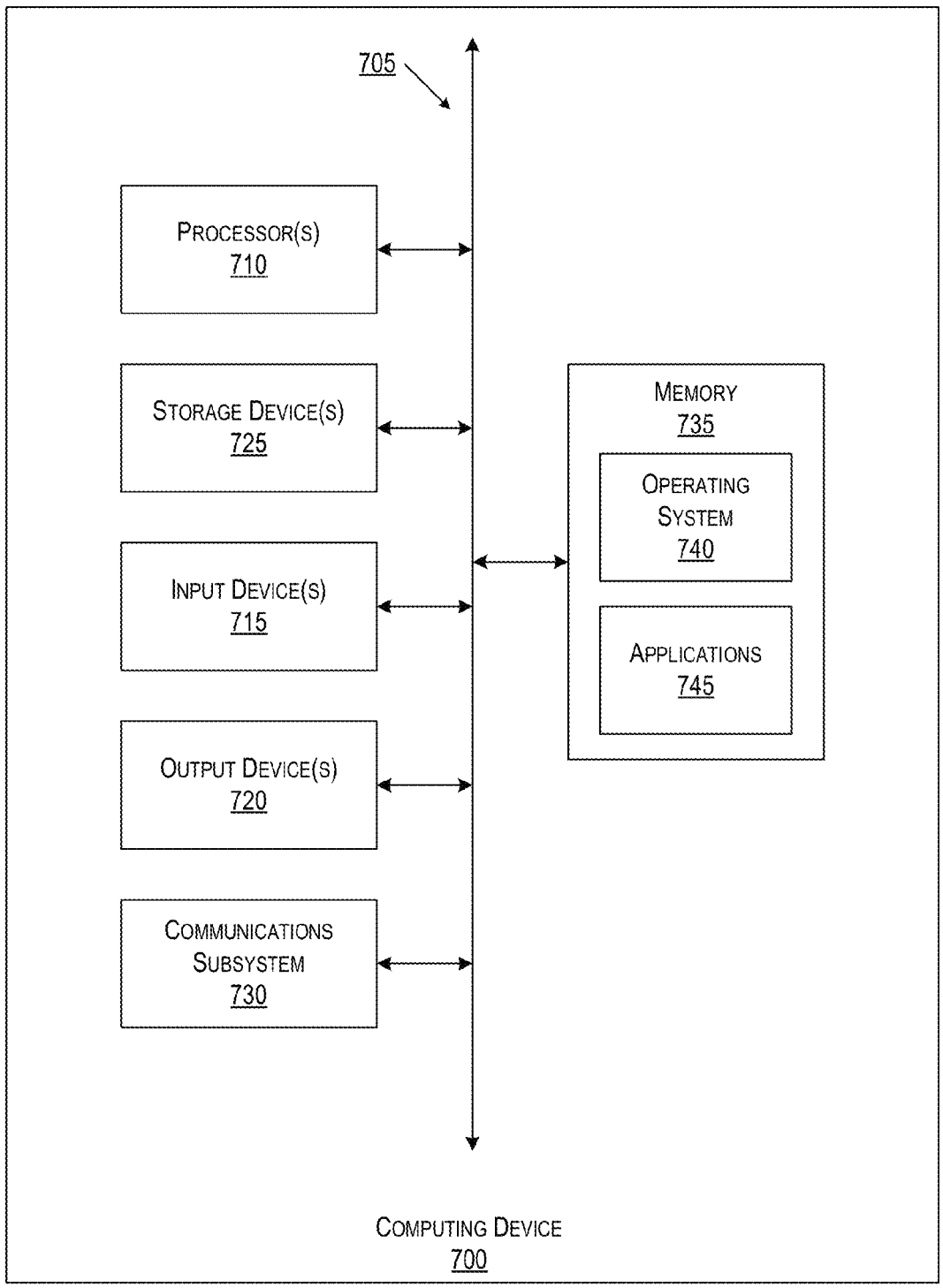
FIG. 15 illustrates an example of a computing system in which one or more embodiments may be implemented.

According to one or more aspects, a computer system as illustrated in FIG. 15 may be incorporated as part of a computing device, which may implement, perform, and/or execute any and/or all of the features, methods, and/or method steps described herein. For example, computer system 700 may represent some of the components of a small cell 100, an access point 320, a crowdsourcing server 330, or any other computing device, such as a laptop computer, a tablet computer, a mobile device 370, a video-game console, or a desktop computer. In addition, computer system 700 may represent some of the components of small cell 100 of FIG. 1. FIG. 15 provides a schematic illustration of one embodiment of a computer system 700 that can perform the methods provided by various other embodiments, as described herein. FIG. 15 is meant only to provide a generalized illustration of various components, any and/or all of which may be utilized as appropriate. FIG. 15, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, small cell baseband processor, processor 375 of the crowdsourcing server and/or the like); one or more input devices 715, which can include without limitation a camera, a mouse, a keyboard and/or the like; and one or more output devices 720, which can include without limitation a display unit, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a Wi-Fi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 4C, 4D and 5, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. The memory 380 in FIG. 3B can be an example of the working memory of 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example one or more steps of the methods described with respect to FIGS. 4C, 4D and 5.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, in some embodiments, a device other than a small cell 100 may include and/or otherwise provide one or more of the components and/or functionalities discussed above, and accordingly may implement one or more embodiments described herein.

In still additional and/or alternative embodiments, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A small cell-based method for crowdsourcing wireless signals comprising:
  observing, by a small cell installed at a known location, one or more wireless signals at the known location within an operating environment comprising signals from the small cell and one or more non-small cell sources, wherein the one or more wireless signals observed by the small cell comprise signals from the one or more non-small cell sources, wherein the one or more non-small cell sources comprise at least one Long Term Evolution (LTE) cell, wherein the small cell comprises a built-in network listen receiver for observing cellular downlink signals; and providing, by the small cell, to at least one crowdsourcing server, information that (1) identifies the known location, (2) describes one or more detected properties of the one or more observed wireless signals from the one or more non-small cell sources, wherein the one or more detected properties comprise an indication of a Positioning Reference Signal (PRS) sequence transmitted by the at least one LTE cell, and (3) identifies the small cell as a sender of the information, wherein the at least one crowdsourcing server determines a reliability ranking for the information.

2. The method of claim 1, wherein the information provided to at least one crowdsourcing server is a PRS configuration based on an observed LTE downlink signal.

3. The method of claim 2, wherein the PRS configuration includes at least one of:
one or more PRS bandwidth information elements;
one or more PRS Configuration Indices;
one or more Number of PRS Subframes information elements; and
one or more PRS Muting Information elements.

4. The method of claim 1, wherein the small cell is a microcell, picocell or femtocell.

5. The method of claim 1, wherein the information that identifies the known location and describes the one or more detected properties of the one or more observed wireless signals includes at least one of:
one or more received signal strength indication (RSSI) measurements corresponding to the one or more observed wireless signals;
one or more time of arrival (TOA) measurements corresponding to the one or more observed wireless signals;
one or more time difference of arrival (TDOA) measurements corresponding to at least two of the one or more observed wireless signals;
one or more angle of arrival (AOA) measurements corresponding to the one or more observed wireless signals; and
one or more round trip time (RTT) measurements corresponding to the one or more observed wireless signals.

6. The method of claim 1, wherein a network listening receiver observes the one or more wireless signals.

7. The method of claim 1, wherein the information provided to at least one crowdsourcing server includes at least one of:
one or more base station locations corresponding to the one or more observed wireless signals;
one or more base station timings relative to a GNSS time corresponding to the one or more observed wireless signals; and
one or more pilot signal configurations corresponding to the one or more observed wireless signals.

8. The method of claim 7, wherein the GNSS time is a GNSS fine time assistance measurement.

9. The method of claim 1, wherein the information provided to at least one crowdsourcing server is provided periodically, when requested by the at least one crowdsourcing server or when the information changes.

10. The method of claim 1, wherein the one or more wireless signals include at least one of:
GSM signals;
UMTS signals;
LTE signals;
CDMA signals; and
WLAN signals.

11. The method of claim 1, wherein the known location is derived from an A-GNSS module inside the small cell.

12. The method of claim 1, wherein a local database can provide the small cell with location information for a base station or access point.

13. The method of claim 1, wherein the information provided by the small cell to at least one crowdsourcing server is measurement data.

14. A small cell for crowdsourcing wireless signals comprising:
one or more small cell baseband processors; and
memory storing computer-readable instructions that, when executed by the one or more small cell baseband processors, cause the small cell to:
observe one or more wireless signals at a known location at which the small cell is installed, wherein the known location is within an operating environment comprising signals from the small cell and one or more non-small cell sources, wherein the one or more wireless signals observed by the small cell comprise signals from the one or more non-small cell sources, wherein the one or more non-small cell sources comprise at least one Long Term Evolution (LTE) cell, wherein the small cell comprises a built-in network listen receiver for observing cellular downlink signals; and
provide, to at least one crowdsourcing server, information that (1) identifies the known location, (2) describes one or more detected properties of the one or more observed wireless signals from the one or more non-small cell sources, wherein the one or more detected properties comprise an indication of a Positioning Reference Signal (PRS) sequence transmitted by the at least one LTE cell, and (3) identifies the small cell as a sender of the information, wherein the at least one crowdsourcing server determines a reliability ranking for the information.

15. The small cell of claim 14, wherein the information provided to at least one crowdsourcing server is a PRS configuration based on an observed LTE downlink signal.

16. The small cell of claim 15, wherein the PRS configuration includes at least one of:
one or more PRS bandwidth information elements;
one or more PRS Configuration Indices;
one or more Number of PRS Subframes information elements; and
one or more PRS Muting Information elements.

17. The small cell of claim 14, wherein the small cell is a microcell, picocell or femtocell.

18. The small cell of claim 14, wherein the information that identifies the known location and describes the one or more detected properties of the one or more observed wireless signals includes at least one of:
one or more received signal strength indication (RSSI) measurements corresponding to the one or more observed wireless signals;
one or more time of arrival (TOA) measurements corresponding to the one or more observed wireless signals;
one or more time difference of arrival (TDOA) measurements corresponding to at least two of the one or more observed wireless signals;

one or more angle of arrival (AOA) measurements corresponding to the one or more observed wireless signals; and
one or more round trip time (RTT) measurements corresponding to the one or more observed wireless signals.

19. The small cell of claim 14, wherein a network listening receiver observes the one or more wireless signals.

20. The small cell of claim 14, wherein the information provided to at least one crowdsourcing server includes at least one of:
one or more base station locations corresponding to the one or more observed wireless signals;
one or more base station timings relative to a GNSS time corresponding to the one or more observed wireless signals; and
one or more pilot signal configurations corresponding to the one or more observed wireless signals.

21. The small cell of claim 20, wherein the GNSS time is a GNSS fine time assistance measurement.

22. The small cell of claim 14, wherein the information provided to at least one crowdsourcing server is provided periodically, when requested by the at least one crowdsourcing server or when the information changes.

23. The small cell of claim 14, wherein the one or more wireless signals include at least one of:
GSM signals;
UMTS signals;
LTE signals;
CDMA signals; and
WLAN signals.

24. The small cell of claim 14, wherein the known location is derived from an A-GNSS module inside the small cell.

25. The small cell of claim 14, wherein a local database can provide the small cell with location information for a base station or access point.

26. The small cell of claim 14, wherein the information provided by the small cell to at least one crowdsourcing server is measurement data.

27. One or more non-transitory computer-readable media storing computer-executable instructions for crowdsourcing wireless signals that, when executed, cause one or more computing devices included in a small cell to:
observe one or more wireless signals at a known location at which the small cell is installed, wherein the known location is within an operating environment comprising signals from the small cell and one or more non-small cell sources, wherein the one or more wireless signals observed by the small cell comprise signals from the one or more non-small cell sources, wherein the one or more non-small cell sources comprise at least one Long Term Evolution (LTE) cell, wherein the small cell comprises a built-in network listen receiver for observing cellular downlink signals; and
provide, to at least one crowdsourcing server, information that (1) identifies the known location, (2) describes one or more detected properties of the one or more observed wireless signals from the one or more non-small cell sources, wherein the one or more detected properties comprise an indication of a Positioning Reference Signal (PRS) sequence transmitted by the at least one LTE cell, and (3) identifies the small cell as a sender of the information, wherein the at least one crowdsourcing server determines a reliability ranking for the information.

28. The one or more non-transitory computer-readable media of claim 27, wherein the information provided to at least one crowdsourcing server is a PRS configuration based on an observed LTE downlink signal.

29. The one or more non-transitory computer-readable media of claim 28, wherein the PRS configuration includes at least one of:
one or more PRS bandwidth information elements;
one or more PRS Configuration Indices;
one or more Number of PRS Subframes information elements; and
one or more PRS Muting Information elements.

30. The one or more non-transitory computer-readable media of claim 27, wherein the small cell is a microcell, picocell or femtocell.

31. The one or more non-transitory computer-readable media of claim 27, wherein the information that identifies the known location and describes the one or more detected properties of the one or more observed wireless signals includes at least one of:
one or more received signal strength indication (RSSI) measurements corresponding to the one or more observed wireless signals;
one or more time of arrival (TOA) measurements corresponding to the one or more observed wireless signals;
one or more time difference of arrival (TDOA) measurements corresponding to at least two of the one or more observed wireless signals;
one or more angle of arrival (AOA) measurements corresponding to the one or more observed wireless signals; and
one or more round trip time (RTT) measurements corresponding to the one or more observed wireless signals.

32. The one or more non-transitory computer-readable media of claim 27, wherein a network listening receiver observes the one or more wireless signals.

33. The one or more non-transitory computer-readable media of claim 27, wherein the information provided to at least one crowdsourcing server includes at least one of:
one or more base station locations corresponding to the one or more observed wireless signals;
one or more base station timings relative to a GNSS time corresponding to the one or more observed wireless signals; and
one or more pilot signal configurations corresponding to the one or more observed wireless signals.

34. The one or more non-transitory computer-readable media of claim 33, wherein the GNSS time is a GNSS fine time assistance measurement.

35. The one or more non-transitory computer-readable media of claim 27, wherein the information provided to at least one crowdsourcing server is provided periodically, when requested by the at least one crowdsourcing server or when the information changes.

36. The one or more non-transitory computer-readable media of claim 27, wherein the one or more wireless signals include at least one of:
GSM signals;
UMTS signals;
LTE signals;
CDMA signals; and
WLAN signals.

37. The one or more non-transitory computer-readable media of claim 27, wherein the known location is derived from an A-GNSS module inside the small cell.

38. The one or more non-transitory computer-readable media of claim 27, wherein a local database can provide the small cell with location information for a base station or access point.

39. The one or more non-transitory computer-readable media of claim 27, wherein the information provided by the small cell to at least one crowdsourcing server is measurement data.

40. A small cell for crowdsourcing wireless signals comprising:
  means for observing, by a small cell installed at a known location, one or more wireless signals at the known location within an operating environment comprising signals from the small cell and one or more non-small cell sources, wherein the one or more wireless signals observed by the small cell comprise signals from the one or more non-small cell sources, wherein the one or more non-small cell sources comprise at least one Long Term Evolution (LTE) cell, wherein the small cell comprises a built-in network listen receiver for observing cellular downlink signals; and
  means for providing, by the small cell, to at least one crowdsourcing server, information that (1) identifies the known location, (2) describes one or more detected properties of the one or more observed wireless signals from the one or more non-small cell sources, wherein the one or more detected properties comprise an indication of a Positioning Reference Signal (PRS) sequence transmitted by the at least one LTE cell, and (3) identifies the small cell as a sender of the information, wherein the at least one crowdsourcing server determines a reliability ranking for the information.

41. The small cell of claim 40, wherein the information provided to at least one crowdsourcing server is a PRS configuration based on an observed LTE downlink signal.

42. The small cell of claim 41, wherein the PRS configuration includes at least one of:
  one or more PRS bandwidth information elements;
  one or more PRS Configuration Indices;
  one or more Number of PRS Subframes information elements; and
  one or more PRS Muting Information elements.

43. The small cell of claim 40, wherein the small cell is a microcell, picocell or femtocell.

44. The small cell of claim 40, wherein the information that identifies the known location and describes the one or more detected properties of the one or more observed wireless signals includes at least one of:
  one or more received signal strength indication (RSSI) measurements corresponding to the one or more observed wireless signals;
  one or more time of arrival (TOA) measurements corresponding to the one or more observed wireless signals;
  one or more time difference of arrival (TDOA) measurements corresponding to at least two of the one or more observed wireless signals;
  one or more angle of arrival (AOA) measurements corresponding to the one or more observed wireless signals; and
  one or more round trip time (RTT) measurements corresponding to the one or more observed wireless signals.

45. The small cell of claim 40, wherein the information provided to at least one crowdsourcing server includes at least one of:
  one or more base station locations corresponding to the one or more observed wireless signals;
  one or more base station timings relative to a GNSS time corresponding to the one or more observed wireless signals; and
  one or more pilot signal configurations corresponding to the one or more observed wireless signals.

46. The small cell of claim 45, wherein the GNSS time is a GNSS fine time assistance measurement.

47. The small cell of claim 40, wherein the information provided to at least one crowdsourcing server is provided periodically, when requested by the at least one crowdsourcing server or when the information changes.

48. The small cell of claim 40, wherein the one or more wireless signals include at least one of:
  GSM signals;
  UMTS signals;
  LTE signals;
  CDMA signals; and
  WLAN signals.

49. The small cell of claim 40, wherein the known location is derived from an A-GNSS module inside the small cell.

50. The small cell of claim 40, wherein a local database can provide the small cell with location information for a base station or access point.

51. The small cell of claim 40, wherein the information provided by the small cell to at least one crowdsourcing server is measurement data.

* * * * *